US009373966B2

(12) United States Patent
Kapcia

(10) Patent No.: US 9,373,966 B2
(45) Date of Patent: Jun. 21, 2016

(54) WIRELESS POWER AND COMMUNICATION SYSTEMS USING MAGNETIC VECTOR POTENTIAL

(71) Applicant: Divergent, Inc., Novato, CA (US)

(72) Inventor: Jason Kapcia, Chicago, IL (US)

(73) Assignee: Divergent, Inc., Hillsboro, OR (US)

(*) Notice: Subject to any disclaimer, the term of this patent is extended or adjusted under 35 U.S.C. 154(b) by 0 days.

(21) Appl. No.: 14/635,984

(22) Filed: Mar. 2, 2015

(65) Prior Publication Data
US 2015/0249342 A1    Sep. 3, 2015

Related U.S. Application Data

(60) Provisional application No. 61/947,343, filed on Mar. 3, 2014.

(51) Int. Cl.
*G05F 1/10* (2006.01)
*H02J 5/00* (2016.01)
*H04B 5/00* (2006.01)
(Continued)

(52) U.S. Cl.
CPC .............. *H02J 5/005* (2013.01); *H04B 5/0037* (2013.01); *H04B 5/0075* (2013.01); *H02J 7/025* (2013.01); *H02J 17/00* (2013.01)

(58) Field of Classification Search
USPC .................................................... 307/104, 98
See application file for complete search history.

(56) References Cited

U.S. PATENT DOCUMENTS 4,429,280 A    1/1984  Gelinas
4,429,288 A    1/1984  Gelinas
(Continued)

FOREIGN PATENT DOCUMENTS

EP    0050523 A2    4/1982
EP    0920141 A3    6/1999
(Continued)

OTHER PUBLICATIONS

Bearden, T. E., "Engineering the Active Vacuum: On the Asymmetrical Aharonov-Bohm Effect and Magnetic Vector Potential A vs. Magnetic Field B:," [online], The Tom Bearden Website, 2006, [retrieved on Mar. 4, 2015], retrieved from the Internet: <URL: www.cheniere.org>, 28 pages.

(Continued)

*Primary Examiner* — Danny Nguyen
(74) *Attorney, Agent, or Firm* — Kilpatrick Townsend & Stockton LLP; David B. Raczkowski

(57) ABSTRACT

Apparatuses and methods are provided for driving an input conductor with a signal comprising a series of voltage pulses. The pulses can beneficially invoke the skin effect to generate a time-varying magnetic vector potential that projects radially from a surface of the input conductor. The time-varying magnetic vector potential can provide an electric field for inducing output voltage pulses in an output circuit. The input conductor and output circuit can have various configurations. For example, the input conductor can extend along a plane, and the output circuit can at least partially reside in the plane and extend away from the input conductor in the plane. Such a geometry can reduce any back coupling between the two circuits, e.g., between electromagnetic fields caused by any current in the two circuits. Such a geometry would not normally allow for induction between the two circuits, which can reduce any Lenz effects.

26 Claims, 20 Drawing Sheets

(51) Int. Cl.
    *H02J 7/02*     (2016.01)
    *H02J 17/00*    (2006.01)

(56)         References Cited

U.S. PATENT DOCUMENTS

| | | | |
|---|---|---|---|
| 4,432,098 | A | 2/1984 | Gelinas |
| 4,447,779 | A | 5/1984 | Gelinas |
| 4,491,795 | A | 1/1985 | Gelinas |
| 4,605,897 | A * | 8/1986 | Gelinas .............. H04B 5/00 324/202 |
| 5,086,235 | A | 2/1992 | Marquet et al. |
| 5,684,678 | A | 11/1997 | Barrett |
| 5,845,220 | A * | 12/1998 | Puthoff .............. H04B 5/0075 455/899 |
| 6,424,820 | B1 | 7/2002 | Burdick et al. |
| 8,024,692 | B2 | 9/2011 | Suaya |
| 8,120,207 | B2 | 2/2012 | Sanders et al. |
| 8,165,531 | B2 | 4/2012 | Nikolova et al. |
| 8,225,266 | B2 | 7/2012 | Suaya |
| 8,228,027 | B2 | 7/2012 | Gao |
| 8,389,948 | B2 | 3/2013 | Arman et al. |
| 2002/0149890 | A1 | 10/2002 | Kaneko et al. |
| 2005/0116683 | A1 | 6/2005 | Cheng et al. |
| 2006/0076338 | A1 | 4/2006 | Kagan |
| 2007/0242026 | A1 | 10/2007 | Julian et al. |
| 2008/0087091 | A1 | 4/2008 | Shoureshi |
| 2009/0034657 | A1 | 2/2009 | Nikolova et al. |
| 2009/0243683 | A1 | 10/2009 | Ochi et al. |
| 2009/0251925 | A1 | 10/2009 | Usui et al. |
| 2010/0038971 | A1 | 2/2010 | Sanders et al. |
| 2010/0277003 | A1 | 11/2010 | Von Novak et al. |
| 2011/0121920 | A1 | 5/2011 | Kurs et al. |
| 2011/0127846 | A1 | 6/2011 | Urano |
| 2011/0199046 | A1 | 8/2011 | Tsai et al. |
| 2011/0225980 | A1 | 9/2011 | Cheng et al. |
| 2012/0161538 | A1 | 6/2012 | Kinoshita et al. |
| 2012/0299389 | A1 | 11/2012 | Lee et al. |
| 2012/0306282 | A1 * | 12/2012 | Tan et al. .............. 307/104 |
| 2013/0005252 | A1 | 1/2013 | Lee et al. |
| 2013/0127257 | A1 | 5/2013 | Yamamoto |
| 2013/0214610 | A1 | 8/2013 | Tseng |
| 2013/0241304 | A1 | 9/2013 | Bae |
| 2013/0307468 | A1 * | 11/2013 | Lee et al. .............. 320/108 |
| 2014/0159501 | A1 | 6/2014 | Kanno et al. |
| 2014/0268895 | A1 | 9/2014 | Keeling |
| 2015/0001956 | A1 | 1/2015 | Saen et al. |
| 2015/0249359 | A1 | 9/2015 | Gunderson |

FOREIGN PATENT DOCUMENTS

| | | |
|---|---|---|
| JP | 11-331099 A | 11/1999 |
| WO | 98/31073 A2 | 7/1998 |

OTHER PUBLICATIONS

Works, George, et al., "Confirmation Measurements of Vector Potential Waves," QEX, Jul./Aug. 2012, 5 pages.

"Aharonov-Bohm Effect and Magnetic Monopoles," [online], Oct. 24, 2011 course material, [retrieved on Mar. 4, 2015], retrieved from the Internet: <URL: bolvan.ph.utexas.edu/~vadim/Classes/11f/abm.pdf>, 12 pages.

Varma, Ram, K., "Observability of the effects of curl-free magnetic vector potential on the macroscale and the nature of the 'transition amplitude wave'" PRAMANA Journal of Physics, Apr. 2010, vol. 74, No. 4, pp. 491-511.

Shukla, P. K., "Curl-free vector potential observed at the macroscale," Physica Scriptia, 2012, vol. 86, 3 pages.

U.S. Appl. No. 14/635,872 (unpublished), filed Mar. 2, 2015, entitled, "Using Skin Effect to Produce a Magnetic Vector Potential for Inducing a Voltage," 67 pages.

U.S. Appl. No. 14/635,971 (unpublished), filed Mar. 2, 2015, entitled, "Generation and Use of Electric Fields from Capacitive Effects of a Solenoid," 47 pages.

International Search Report and Written Opinion mailed Jun. 3, 2015 in PCT/US2015/018312, 30 pages.

Office Action mailed Jun. 9, 2015 in U.S. Appl. No. 14/635,672, 12 pages.

Office Action mailed Sep. 15, 2015 in U.S. Appl. No. 14/635,971, 15 pages.

Notice of Allowance issued on Feb. 1, 2016, U.S. Appl. No. 14/535,971, filed Mar. 2, 2015, 9 pages.

* cited by examiner

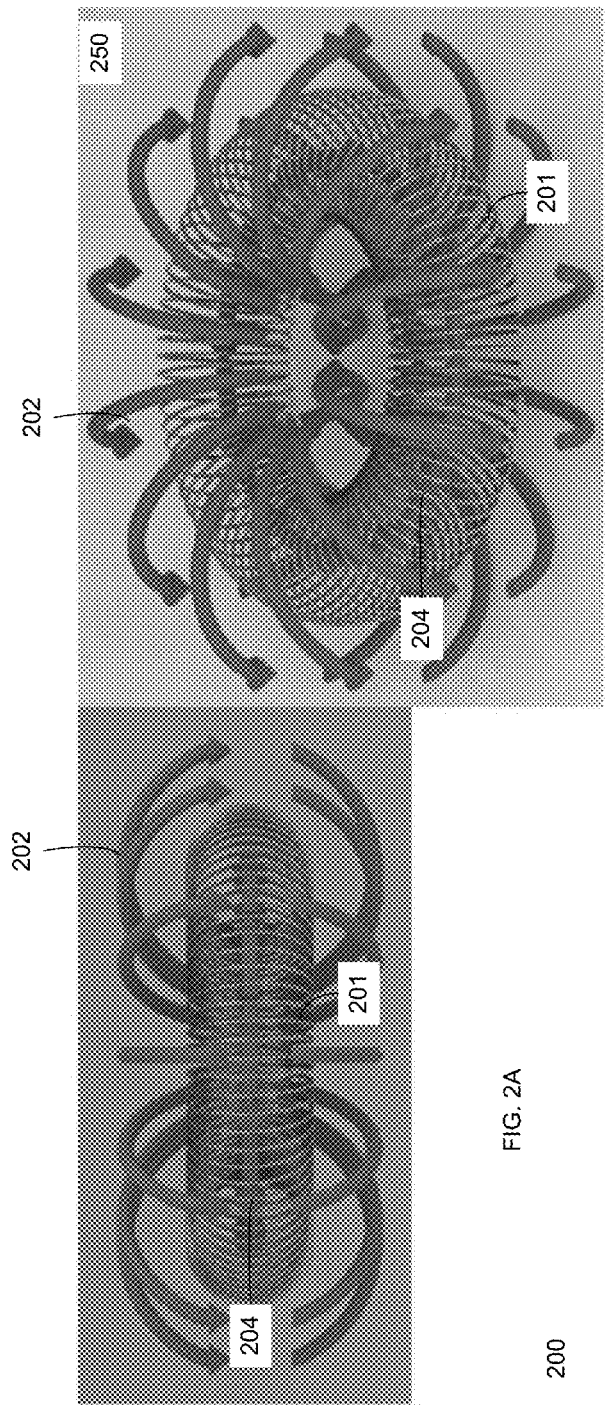

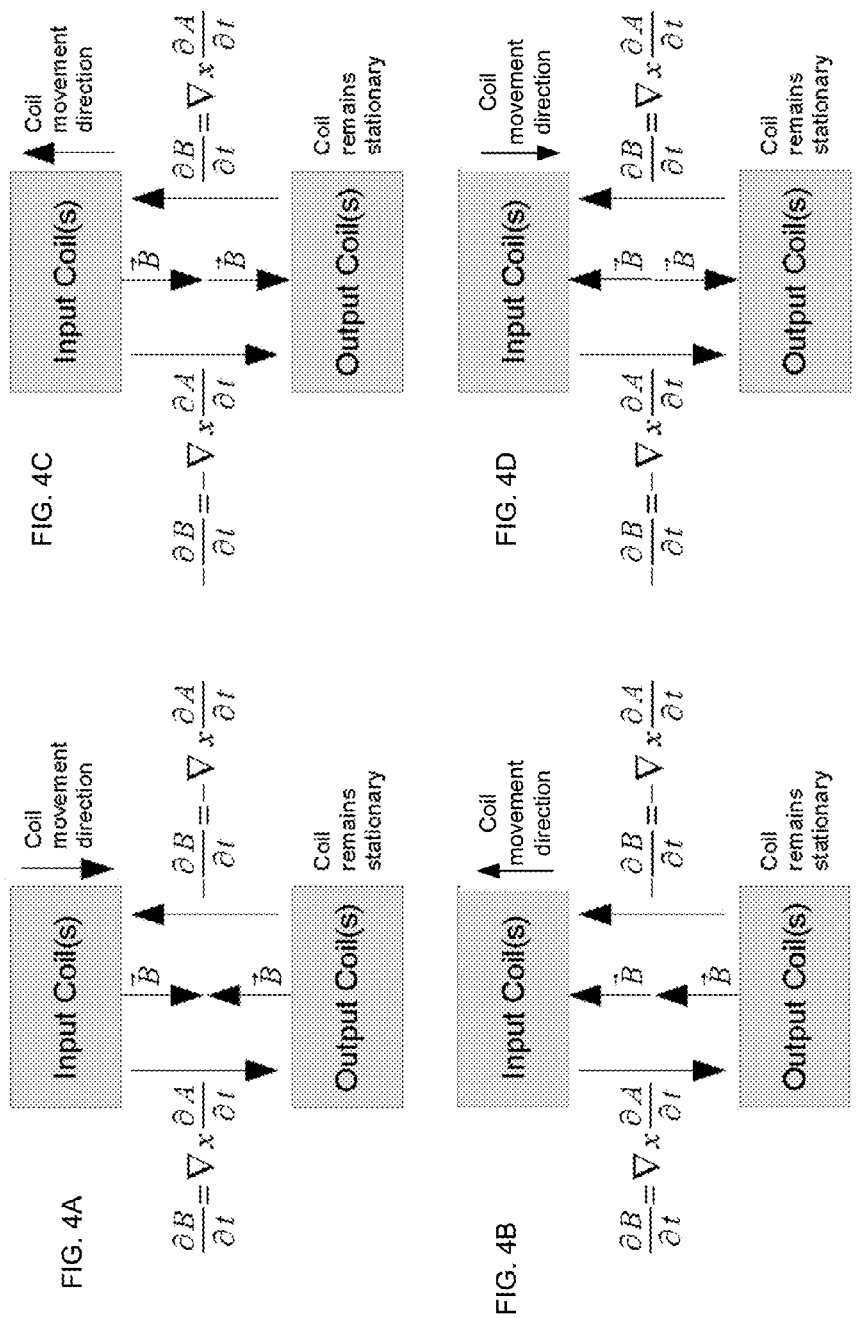

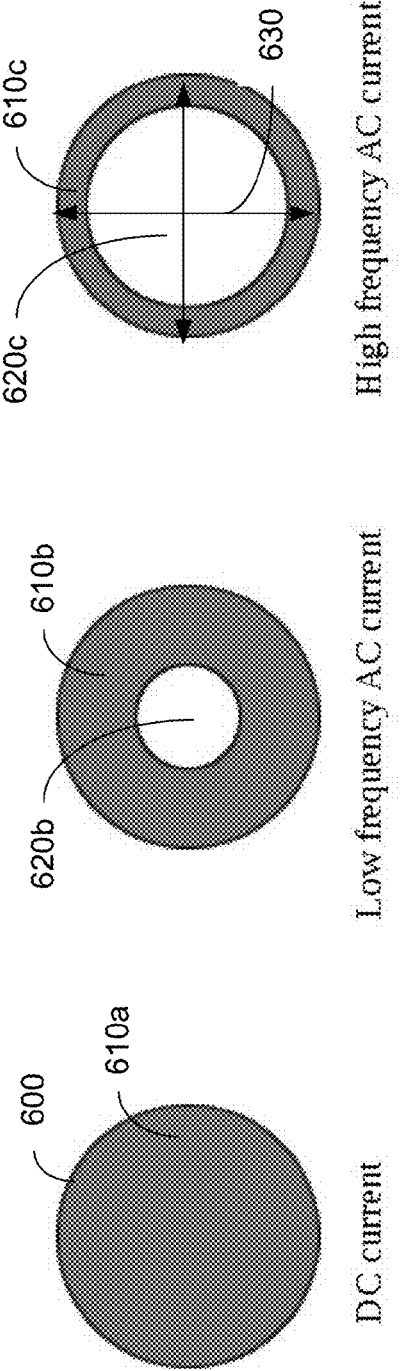

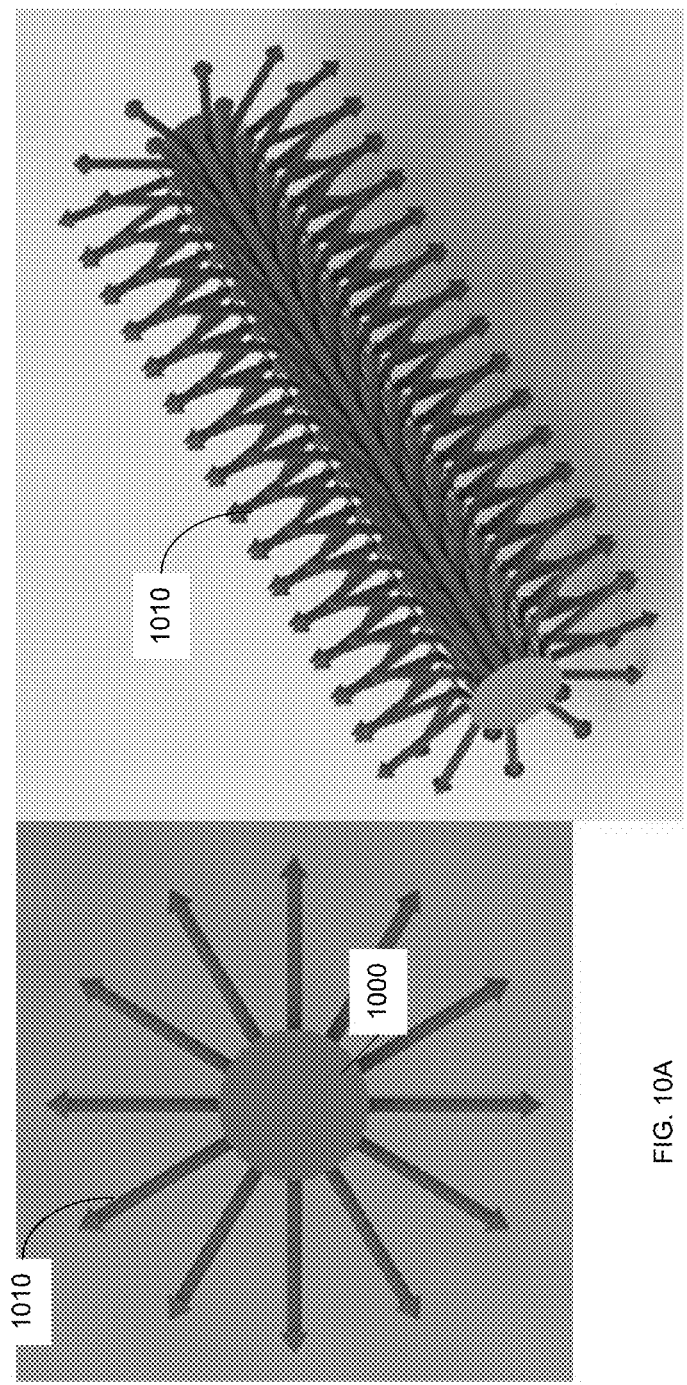

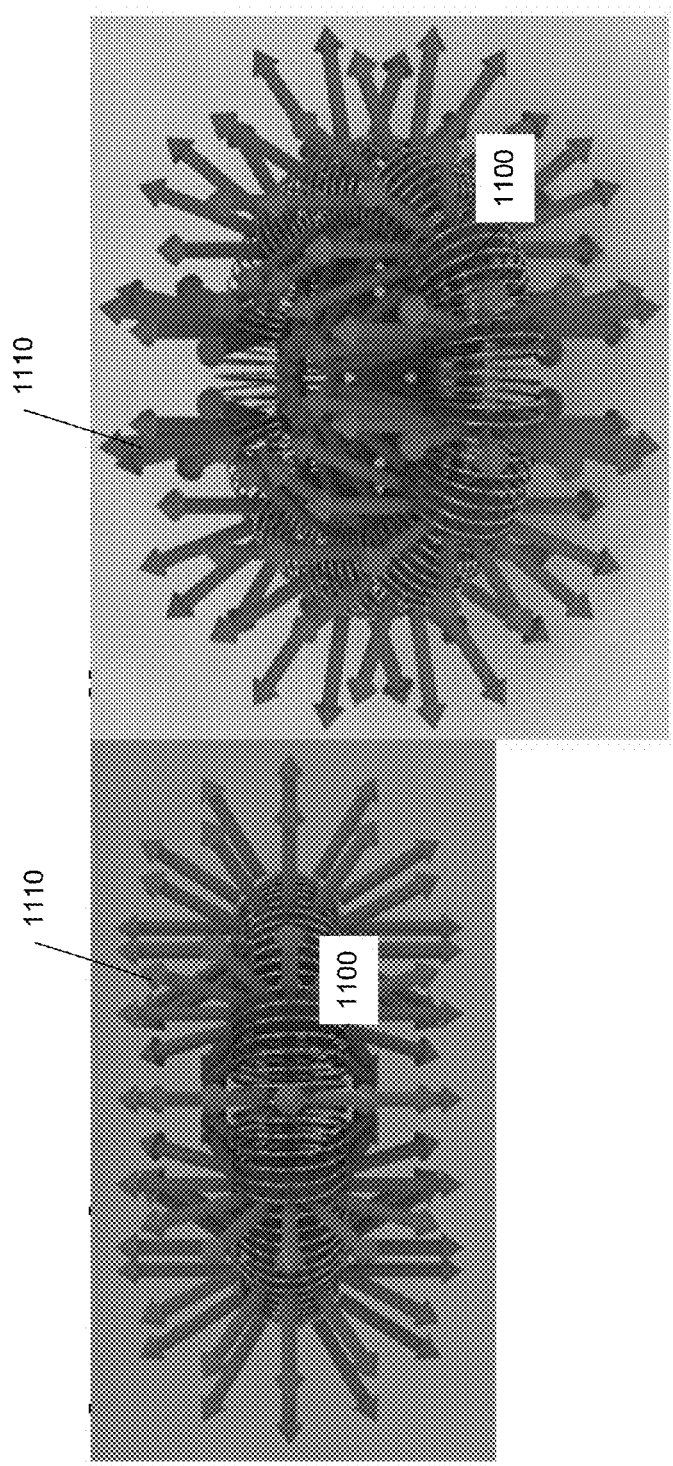

| | 1us pulse width, 50ns rise time | 750ns pulse width, 50ns rise time | 500ns pulse width, 30ns rise time | 250ns pulse width, 30ns rise time | 250ns pulse width, 21ns rise time | 150ns pulse width, 12ns rise time | 7.5ns pulse width, 3ns rise time |
|---|---|---|---|---|---|---|---|
| 1 | 0.09 | 0.01 | 0.24 | 0.11 | 2.09 | 11.51 | 8.87 |
| 75 | 0.12 | 0.11 | 0.09 | 0.26 | 10.79 | 24.97 | 23.29 |
| 150 | 0.16 | 0.28 | 0.43 | 0.27 | 20.57 | 22.79 | 24.21 |
| 225 | 0.3 | 0.37 | 0.39 | 0.3 | 27.56 | 38.15 | 29.61 |
| 300 | 0.42 | 0.36 | 0.46 | 0.47 | 32.76 | 42.67 | 47.61 |
| 375 | 0.46 | 0.47 | 0.43 | 0.51 | 39.06 | 45.92 | 54.3 |
| 450 | 0.57 | 0.5 | 0.53 | 0.72 | 48.83 | 54.86 | 70.12 |
| 525 | 0.63 | 0.6 | 0.58 | 0.76 | 54.81 | 65.21 | 132.91 |
| 600 | 0.63 | 0.65 | 0.65 | 0.74 | 62.95 | 68.23 | 181.85 |
| 675 | 0.73 | 0.69 | 0.72 | 0.68 | 137.58 | 150.82 | 325.52 |
| 750 | 0.86 | 0.85 | 1.03 | 0.86 | 227.4 | 232.08 | 477.73 |
| 825 | 0.88 | 0.97 | 0.93 | 0.98 | 415.08 | 414.84 | 538.34 |
| 900 | 0.91 | 0.97 | 1.37 | 1.36 | 1014.46 | 1066.36 | 2306.65 |
| 975 | 0.98 | 1.04 | 1.5 | 1.67 | 1084.96 | 1166.91 | 2528.18 |
| 1050 | 1.07 | 1.18 | 1.66 | 1.6 | 1182.86 | 1173.69 | 2715.01 |
| 1125 | 1.14 | 1.26 | 1.65 | 1.68 | 1251.04 | 1260.02 | 2918.77 |
| 1200 | 1.26 | 1.22 | 1.61 | 1.89 | 1347.01 | 1379.94 | 2542.8 |
| 1275 | 1.32 | 1.36 | 1.75 | 1.68 | 1416.67 | 1465.91 | 2877.51 |
| 1350 | 1.41 | 1.42 | 2.03 | 1.82 | 1512.29 | 1551.68 | 2462.85 |
| 1425 | 1.47 | 1.55 | 2.11 | 1.99 | 1583.87 | 1668.48 | 3307.78 |
| 1500 | 1.54 | 1.63 | 2.17 | 2.09 | 1687.8 | 1819.58 | 3302.45 |
| 1575 | 1.61 | 1.7 | 2.28 | 2.16 | 1793.02 | 2243.11 | 3547.85 |
| 1650 | 1.67 | 1.79 | 2.05 | 2.1 | 1989.73 | 2049.5 | 3231.5 |
| 1725 | 1.75 | 1.81 | 2.28 | 2.2 | 2075.74 | 2283.42 | 3608.82 |
| 1800 | 1.9 | 1.91 | 2.32 | 2.49 | 2064.27 | 1996.45 | 3079.03 |
| 1875 | 1.94 | 1.94 | 2.3 | 2.49 | 2178.19 | 2357.31 | 3649.74 |
| 1950 | 2 | 1.96 | 2.66 | 2.52 | 2215.26 | 2563.1 | 4101.68 |
| 2025 | 2.1 | 2.05 | 2.64 | 2.65 | 2295.25 | 2677.46 | 3583.76 |
| 2100 | 2.16 | 2.22 | 2.76 | 2.79 | 2454.16 | 2345.21 | 4139.57 |
| 2175 | 2.21 | 2.29 | 2.63 | 2.81 | 2586.79 | 2505.74 | 4248.25 |
| 2250 | 2.32 | 2.34 | 2.64 | 2.73 | 2705.66 | 2852.44 | 3645.16 |
| 2325 | 2.33 | 2.36 | 2.87 | 2.88 | 2632.96 | 2781.42 | 4422.9 |
| 2400 | 2.47 | 2.53 | 2.78 | 3.03 | 2695.31 | 2808.73 | 4432.21 |
| 2475 | 2.52 | 2.5 | 3.03 | 3.07 | 2830.73 | 2869.22 | 4370.52 |
| 2550 | 2.65 | 2.6 | 3.05 | 3.14 | 2946.17 | 3205.39 | 4812.43 |
| 2625 | 2.7 | 2.63 | 3.04 | 3.12 | 3049.88 | 3174.69 | 4469.79 |
| 2700 | 2.79 | 2.7 | 3.18 | 3.3 | 3155.98 | 3087.25 | 4697.86 |
| 2775 | 2.81 | 2.87 | 3.24 | 3.17 | 3254.45 | 3163.16 | 5548.99 |
| 2850 | 2.94 | 3 | 3.5 | 3.33 | 3201.29 | 3639.12 | 5009.03 |
| 2925 | 3.03 | 3 | 3.38 | 3.46 | 3452.94 | 3569.87 | 5357.83 |
| 3000 | 3.05 | 3.03 | 3.36 | 3.67 | 3515.15 | 3578.01 | 5449.36 |
| 3075 | 3.08 | 3.12 | 3.5 | 3.79 | 3615.43 | 3704.31 | 5622.31 |
| 3150 | 3.16 | 3.16 | 3.64 | 3.82 | 3593.13 | 3632.18 | 5279.82 |
| 3225 | 3.25 | 3.27 | 3.78 | 3.87 | 3609.86 | 3943.25 | 5591.45 |
| 3300 | 3.34 | 3.34 | 3.65 | 3.97 | 3745.06 | 3991.26 | 4831.74 |
| 3375 | 3.45 | 3.44 | 3.79 | 3.99 | 3816.48 | 4211.4 | 5616.56 |
| 3450 | 3.47 | 3.5 | 4.13 | 4.15 | 3938.2 | 4230.31 | 5691.81 |
| 3525 | 3.6 | 3.61 | 4.23 | 4.18 | 4097.17 | 3962.65 | 5677.09 |
| 3600 | 3.7 | 3.63 | 4.21 | 4.11 | 4127.52 | 4213.48 | 5914 |
| 3675 | 3.79 | 3.78 | 4.07 | 4.38 | 4109.5 | 4521.88 | 6238.28 |
| 3750 | 3.76 | 3.8 | 4.24 | 4.47 | 4167.48 | 4361.59 | 6510.66 |

| Input Voltage | Output Voltage | | | | | |
|---|---|---|---|---|---|---|
| | 1us pulse width, 5ns rise time | 750ns pulse width, 5.0ns rise time | 500ns pulse width, 30ns rise time | 250ns pulse width, 30ns rise time | 250ns pulse width, 21ns rise time | 150ns pulse width, 12ns rise time | 7.5ns pulse width, 3ns rise time |
| 1 | 0.04 | 0.07 | 0.11 | 0.21 | 1.43 | 3.56 | 16.45 |
| 75 | 0.16 | 0.1 | 0.14 | 0.21 | 12.22 | 13.01 | 18.89 |
| 150 | 0.21 | 0.19 | 0.21 | 0.29 | 10.87 | 13.67 | 23.11 |
| 225 | 0.32 | 0.36 | 0.38 | 0.36 | 20.22 | 24.12 | 27.46 |
| 300 | 0.34 | 0.39 | 0.59 | 0.59 | 23.98 | 23.06 | 42.95 |
| 375 | 0.39 | 0.41 | 0.67 | 0.4 | 27.33 | 36.34 | 34.89 |
| 450 | 0.56 | 0.59 | 0.54 | 0.65 | 29.66 | 37.15 | 47.51 |
| 525 | 0.61 | 0.62 | 0.74 | 0.82 | 33.92 | 41.31 | 41.7 |
| 600 | 0.7 | 0.71 | 0.67 | 0.82 | 36.45 | 46.58 | 142.08 |
| 675 | 0.69 | 0.76 | 0.89 | 0.96 | 88.15 | 95.75 | 262.33 |
| 750 | 0.84 | 0.88 | 0.95 | 0.97 | 136.12 | 152.01 | 287.33 |
| 825 | 0.94 | 0.86 | 1.08 | 0.92 | 241.11 | 284.09 | 289.19 |
| 900 | 0.95 | 0.95 | 1.31 | 1.32 | 629.76 | 685.89 | 1512.82 |
| 975 | 1.03 | 1.06 | 1.31 | 1.54 | 642.18 | 752.03 | 1226.61 |
| 1050 | 1.15 | 1.13 | 1.5 | 1.48 | 725.22 | 778.13 | 1677.57 |
| 1125 | 1.16 | 1.13 | 1.83 | 1.62 | 767.95 | 893.68 | 2056.9 |
| 1200 | 1.29 | 1.27 | 1.53 | 1.76 | 805.6 | 923.86 | 1941.68 |
| 1275 | 1.31 | 1.35 | 1.83 | 1.8 | 842.83 | 978.31 | 2051.26 |
| 1350 | 1.42 | 1.41 | 2.04 | 1.86 | 897.67 | 1019.57 | 1732.49 |
| 1425 | 1.46 | 1.54 | 1.9 | 1.92 | 909.62 | 1086.47 | 2104.71 |
| 1500 | 1.5 | 1.56 | 2 | 2.01 | 1046.06 | 1181.76 | 2109.17 |
| 1575 | 1.65 | 1.69 | 2.26 | 2.27 | 1213.29 | 1393.04 | 2297.54 |
| 1650 | 1.67 | 1.7 | 2.02 | 2.28 | 1251.91 | 1549.16 | 2075.8 |
| 1725 | 1.82 | 1.83 | 2.22 | 2.29 | 1159.03 | 1366.7 | 1761.21 |
| 1800 | 1.88 | 1.93 | 2.37 | 2.43 | 1441.01 | 1442.67 | 2569.8 |
| 1875 | 1.97 | 1.94 | 2.33 | 2.42 | 1290.92 | 1621.87 | 2597.28 |
| 1950 | 1.96 | 2.09 | 2.52 | 2.66 | 1295.48 | 1537 | 2381.63 |
| 2025 | 2.07 | 2.04 | 2.51 | 2.5 | 1492.3 | 1838.49 | 2500.95 |
| 2100 | 2.19 | 2.17 | 2.77 | 2.58 | 1422.5 | 1607.62 | 2259.27 |
| 2175 | 2.21 | 2.28 | 2.63 | 2.75 | 1720.38 | 1800.85 | 2723.43 |
| 2250 | 2.26 | 2.32 | 2.95 | 2.64 | 1545.92 | 1806.39 | 2581.59 |
| 2325 | 2.36 | 2.47 | 2.81 | 2.92 | 1960.62 | 1930.04 | 2610.53 |
| 2400 | 2.41 | 2.42 | 2.77 | 2.86 | 1566.89 | 1811.71 | 2605.01 |
| 2475 | 2.52 | 2.49 | 3.16 | 3.02 | 1583.46 | 1998.43 | 3055.28 |
| 2550 | 2.62 | 2.58 | 3.06 | 3.24 | 1601.98 | 2064.76 | 3094.93 |
| 2625 | 2.74 | 2.68 | 3.12 | 3.02 | 1896.68 | 2014.61 | 2843.39 |
| 2700 | 2.74 | 2.82 | 3.36 | 3.21 | 1994.52 | 2167.63 | 3510.57 |
| 2775 | 2.89 | 2.9 | 3.38 | 3.35 | 1778.84 | 2102.85 | 3188.81 |
| 2850 | 2.9 | 2.97 | 3.35 | 3.56 | 1901.98 | 2379.95 | 3562.23 |
| 2925 | 2.95 | 3.02 | 3.63 | 3.6 | 2135.23 | 2306.73 | 3516 |
| 3000 | 3.12 | 3.02 | 3.54 | 3.51 | 2114.45 | 2452.22 | 3207.86 |
| 3075 | 3.13 | 3.09 | 3.78 | 3.51 | 2221.33 | 2620.51 | 3714.71 |
| 3150 | 3.23 | 3.22 | 3.65 | 3.55 | 2136.03 | 2665.61 | 3415.51 |
| 3225 | 3.34 | 3.28 | 3.9 | 3.9 | 2262.39 | 2493.69 | 3822.99 |
| 3300 | 3.31 | 3.37 | 3.97 | 3.82 | 2359.07 | 2482.05 | 3997.13 |
| 3375 | 3.47 | 3.47 | 3.91 | 4.05 | 2328.41 | 2650.09 | 3948.47 |
| 3450 | 3.53 | 3.51 | 4.13 | 3.91 | 2508.76 | 2594.5 | 3996.89 |
| 3525 | 3.54 | 3.65 | 3.94 | 4.12 | 2558.05 | 2825.33 | 4005.03 |
| 3600 | 3.64 | 3.73 | 3.94 | 4.04 | 2591.78 | 2721.73 | 4018.33 |
| 3675 | 3.68 | 3.78 | 4.29 | 4.29 | 2470.33 | 2927.98 | 4381.64 |
| 3750 | 3.79 | 3.85 | 4.27 | 4.28 | 2677.67 | 2823.03 | 4461.73 |

WIRELESS POWER AND COMMUNICATION SYSTEMS USING MAGNETIC VECTOR POTENTIAL

CROSS-REFERENCES TO RELATED APPLICATIONS

The present application claims priority from and is a nonprovisional application of U.S. Provisional Application No. 61/947,343, entitled "Wireless Power And Communication Systems Using Magnetic Vector Potential" filed Mar. 3, 2014, the entire contents of which are herein incorporated by reference for all purposes.

This application is also related to commonly owned U.S. Provisional Patent Application Nos. 61/947,342 and 61/947,334, the disclosures of which are incorporated by reference in its entirety. This application is also related to commonly owned and concurrently filed U.S. Nonprovisional Patent Applications entitled "Using Skin Effect To Produce A Magnetic Vector Potential For Inducing A Voltage" by Kapcia; and U.S. Patent Application entitled "Generation And Use Of Electric Fields From Capacitive Effects Of A Solenoid" by Kapcia, the disclosures of which are incorporated by reference in its entirety.

BACKGROUND

Typical wireless charging systems drive one circuit with an alternating current, which induces another alternating current in another circuit. This standard operation results in an interaction between electric and magnetic fields (e.g., via Lenz's law), which can act to oppose changes in the system. These interactions can reduce efficiency in the operation of the charging system.

Typical communication systems also operate in a similar manner by driving one circuit with an oscillating current to produce a transverse electromagnetic wave (e.g., radio waves or microwaves). A receiving antenna interacts with the transverse electromagnetic wave, and a current signal is created in the antenna. Such a signal can be decoded to obtain data encoded in the transverse electromagnetic wave. Similar issues can arise with communication systems as with power systems.

Therefore, it is desirable to provide improved systems, apparatuses, and methods for wireless charging and communication systems.

BRIEF SUMMARY

Embodiments provide apparatuses and methods for driving an input conductor with a signal comprising a series of voltage pulses. The pulses can use the skin effect to generate a time-varying magnetic vector potential that projects radially from a surface of the input conductor. The time-varying magnetic vector potential can provide an electric field for inducing output voltage pulses in an output circuit.

Voltage pulses having a rapid change to a maximum voltage (e.g., a rise time of less than 30 ns) can be used to increase the skin effect, while reducing any opposing emf as the amount of current is reduced due to a short duration of the pulse. During the rapid increase in voltage of a pulse, the skin effect can cause electrons to move towards a surface of the input conductor, thereby causing a magnetic vector potential in a direction perpendicular to the surface. The voltage pulses can be of sufficiently short duration that an appreciable current along the wire does not occur, and thus a time-varying magnetic field and the opposing emf do not result to an appreciable degree.

The input conductor and output circuit can have various configurations. For example, the input conductor can extend along a plane, and the output circuit can at least partially reside in the plane and extend away from the input conductor in the plane. Such a geometry can reduce any back coupling between the two circuits, e.g., between electromagnetic fields caused by any current in the two circuits. Such a geometry would not normally allow for induction between the two circuits, which can reduce any Lenz effects. One embodiment has the input conductor being a toroidal coil and the output circuit being a flat coil (also called a pancake coil).

A better understanding of the nature and advantages of embodiments of the present invention may be gained with reference to the following detailed description and the accompanying drawings.

BRIEF DESCRIPTION OF THE DRAWINGS

FIG. 2A shows a toroidal coil 201 according to a conventional design. FIG. 2B shows a diagram 250 of a perspective view of toroidal coil 201.

FIGS. 4A-4D show block diagrams of four potential standard (coiled) wire interactions demonstrating the back-coupling, self-limiting behavior described in Lenz's law.

FIGS. 6A-6C provide cross-sectional views of a conductive wire 600 carrying different types of currents to illustrate the skin effect according to embodiments of the present invention.

FIG. 10A shows a cross-sectional view of a wire 1000 with a radial magnetic vector potential 1010 produced from voltage pulses according to embodiments of the present invention. FIG. 10B shows a perspective view of wire 1000 and the radial magnetic vector potential 1010 having a nonzero divergence according to embodiments of the present invention.

FIG. 11A shows a side view of a toroidal coil 1100 with a radial magnetic vector potential 1110 produced from voltage pulses according to embodiments of the present invention. FIG. 11B shows a perspective view of toroidal coil 1100.

FIG. 16 shows a table 1600 of the data points used to create plots of FIGS. 15A and 15B according to embodiments of the present invention.

FIG. 18 shows a table 1800 of the data points used to create plots of FIGS. 17A and 17B according to embodiments of the present invention.

TERMS

Figures 1A, 1B:
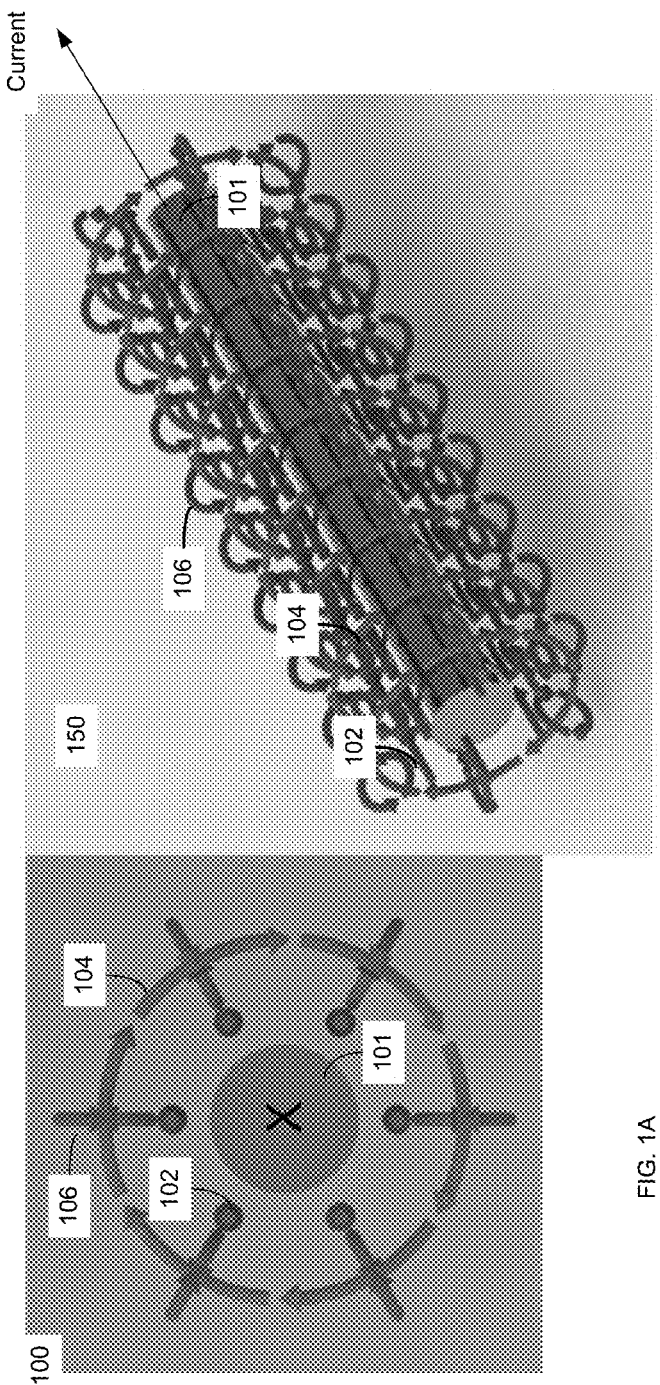
FIG. 1A shows a diagram 100 illustrating the magnetic vector potential and magnetic fields resulting from current in a wire 101.
FIG. 1B shows a diagram 150 of a perspective view of wire 101.

As used herein, a "pulse" is different than a portion of a periodic, continuous signal. A pulse may have a beginning and ending that does not explicitly depend on other pulses, where as an AC waveform has a specific property throughout the waveform. A pulse would generally be positive or negative. After a pulse, the voltage decays back toward a steady-state value, e.g., toward ground. Thus, an alternating signal (e.g., sinusoidal wave) is not composed of pulses.

A "rise time" of a pulse is an amount of time for a pulse to increase from a first specified value to a second specified value. The first specified value being 10% or less of the amplitude, and the second specified value is 90% or more of the amplitude. The "amplitude" of a pulse is a maximum voltage achieved by a pulse. A "width" of a pulse corresponds to a time between a leading edge and a falling edge of a pulse. The width can be measured as the width at half of the amplitude, typically referred to as full width at half maximum (FWHM). In other examples, a width of ground to ground could be used.

A "conductor" refers to materials that conduct ions, e.g., electrons. Examples of conductors are metals, certain ceramic materials, and certain carbon structures.

DETAILED DESCRIPTION

Embodiments can provide wireless power and communication between an input conductor (e.g., a coil) and an output circuit, which may include a coil. The input coil can be driven by input voltage pulses having sufficiently short rise times (e.g., less than 30 ns) such that a radial magnetic vector potential is created. The magnetic vector potential varies with time, thereby creating an electric field, which is received at the output circuit. Thus, a current can be created in the output circuit from the voltage pulses in the input current. However, since the input voltage pulses can be of such short duration (e.g., 100, 10, or 1 microseconds or smaller), an appreciable current would not flow in the input conductor. Thus, limitations (e.g., as a result of Lenz's law) resulting from such a standard input current can be reduced or eliminated.

I. Electrodynamics

In order to understand how to produce and optimize the divergence of the magnetic vector potential $\vec{A}$, we will begin by describing the base Maxwell equations for electromagnetic potentials: $\nabla V$ (electric potential) and $$\frac{\partial \vec{A}}{\partial t}$$

(time derivative of the magnetic vector potential $\vec{A}$), both of which can result in an electric field.

A. Magnetic Vector Potential

Both the Aharonov-Bohm effect and Josephson junctions, in addition to a number of other quantum mechanical phenomena, demonstrate that electromagnetic potentials (specifically the magnetic vector potential $\vec{A}$) form the physical basis from which electric and magnetic fields emerge. For example, the magnetic field $\vec{B}$ is defined in term of the magnetic vector potential $\vec{A}$, namely the magnetic field $\vec{B}$ equals the curl ($\nabla \times$) of the magnetic vector potential $\vec{A}$:

$$\vec{B} = \nabla \times \vec{A}.$$

The electric field can also be generated from the magnetic vector potential $\vec{A}$, as well as the electric potential $\nabla V$ (also referred to as a voltage). The electric field equals the gradient of a voltage added to the partial derivative of the magnetic vector potential $\vec{A}$ with respect to time:

$$\vec{E} = -\nabla V - \frac{\partial \vec{A}}{\partial t}$$

The negative signs denote direction.

Because $\nabla V$ and $$\frac{\partial \vec{A}}{\partial t}$$

are effectively added to equal the electric field $\vec{E}$, this means $\nabla V$ and $$\frac{\partial \vec{A}}{\partial t}$$

have equivalent units as shown below:

$$\vec{A} = \frac{V \cdot s}{m}, \text{ so } \frac{\partial \vec{A}}{\partial t} = \frac{V}{m},$$

where V is voltage, s is seconds, and m is meters. Thus, the magnetic vector potential $\vec{A}$ equals a voltage times seconds divided by meters, and the partial derivative with respect to time equals a voltage divided by meters. And, the gradient of a voltage equals a voltage divided by meters:

$$\nabla V = \frac{v}{m}.$$

By looking at the two terms in their SI units above, it can be seen that ∇V and $$\frac{\partial \vec{A}}{\partial t}$$

are equivalent and depending on the circumstance, the terms ∇V and $$\frac{\partial \vec{A}}{\partial t}$$

can be used to calculate the electric field $\vec{E}$.

B. Maxwell's Equations

Maxwell equations can be written utilizing the magnetic vector potential $\vec{A}$ as follows:

$$\vec{B} = \nabla \times \vec{A},$$

$$\vec{E} = \frac{\partial \vec{A}}{\partial t}$$

The electric field equals the negative change of the magnetic vector potential $\vec{A}$ over time. The negative sign signifies that the electric field E is in the physical direction opposite to the direction of the changing magnetic vector potential $\vec{A}$.

As can be seen in the above two equations, both the magnetic field $\vec{B}$ and electric field $\vec{E}$ are defined by a modulation or alteration of the magnetic vector potential $\vec{A}$, which demonstrates that $\vec{A}$ serves as the physical basis for both magnetic and electric fields, a fundamental axiom of electrodynamics theory. Because a magnetic field is made from the curl of the magnetic vector potential $\vec{A}$, there is a time-varying magnetic field when there is a time-varying curl of the magnetic vector potential $\vec{A}$. And, when there is a time-varying magnetic vector potential $\vec{A}$, there is an electric field in that same region of space, but there is no requirement that $\vec{A}$ has a non-zero curl.

The equations above can be used to show further relationships between $\vec{B}$ and $\vec{E}$ that might occur:

$$-\frac{\partial \vec{B}}{\partial t} == \frac{\partial (\nabla \times \vec{A})}{\partial t} = -\nabla \times \frac{\partial \vec{A}}{\partial t} = \nabla \times \vec{E}$$

Thus, a magnetic field $\vec{B}$ that is changing through time equals the curl of the magnetic vector potential $\vec{A}$ that is changing over time, which in turns then equals the curl of the electric field $\vec{E}$. Accordingly, a time-varying magnetic field can create a new electric field that has a curl. Since a time-varying $\vec{B}$ is akin to a time-varying curled $\vec{A}$, which produces the magnetic field $\vec{B}$ in the first place, a curled electric field $\vec{E}$ is produced in the region about a straight magnetic field $\vec{B}$ when and only when that magnetic field $\vec{B}$ is changing through time (i.e. is time-varying).

C. Magnetic Field from Current in Wire

FIG. 1A shows a diagram 100 illustrating the magnetic vector potential and magnetic fields resulting from current in a wire 101. Block diagram 100 shows a conventional system where the magnetic vector potential $\vec{A}$ around the wire is in the form of a gradient down the length of the wire with ensuing curl and vorticity of the magnetic vector potential $\vec{A}$ which causes magnetic fields to be created about the wire.

The current in wire 101 is shown going into the diagram. The magnetic vector potential 102 is in the same direction as the current, and is shown outside wire 101. The magnetic vector potential 102 decreases with radial distance away from wire 101, which causes a non-zero curl in magnetic vector potential 102. A magnetic field 104 results from $\vec{B} = \nabla \times \vec{A}$. The circular shape of the magnetic field follows from the radial decay of magnetic vector potential 102.

Now, if the current is increasing over time, then the increase in magnetic field 104 is also clockwise, and a changing electric field is produced. The changing electric field corresponds to time-varying magnetic vector potential 106, which is in the opposite direction of the electric field, FIG. 1B shows a diagram 150 of a perspective view of wire 101. One can see the lines of magnetic vector potential 102 moving with current, and the resulting magnetic field 104. The magnetic vector potential 106 corresponding to the electric field that is generated as a result of the time-varying magnetic field 104 is also shown.

D. Magnetic Field from Current in Toroidal Coil

FIG. 2A shows a toroidal coil 201 according to a conventional design. Magnetic vector potential 202 corresponds to a direction of current in toroidal coil 201, also called a toroidal solenoid. A power supply is not shown, for ease of illustration. A magnetic field 204 results through the core of the coils (which is air in the graphic but is usually ferromagnetic). Toroids are used here because the magnetic field in a toroidal coil is contained within the core. FIG. 2B shows a diagram 250 of a perspective view of toroidal coil 201.

In FIGS. 2A and 2B, if one were to wind a secondary coil around toroidal coil 201 such that the secondary coil was larger than toroidal coil 201 (i.e., toroidal coil 201 is inside the secondary coil), and an AC signal as fed into toroidal coil 201, there would be a changing magnetic vector potential $\vec{A}$, and hence a changing electric field in the same orientation (but opposite direction) as the arrows of magnetic vector potential 202. Since the magnetic field is contained in the core, and the changing magnetic vector potential $\vec{A}$ is not, it is clear to see why an emf can be induced in the secondary coil.

The magnetic vector potential $\vec{A}$ in and around the coil in the conventional geometry is in the form of a gradient down the length of the wire with ensuing curl and vorticity of the magnetic vector potential $\vec{A}$ giving rise to the magnetic fields that are seen in the area of the core of the coil.

E. Lenz's Law

As described above, under normal operation, a changing current encounters an emf in the opposite direction. Thus, to continue changing the current, additional power is required.

FIGS. 3A-3D show Lenz's law for one current loop being driven by alternating current (AC). Each figure shows the direction of the current I, the direction of the magnetic field B, the direction of change Ḃ of the magnetic field, and the direction of the induced current $I_{ind}$ that results.

Figure 3A:
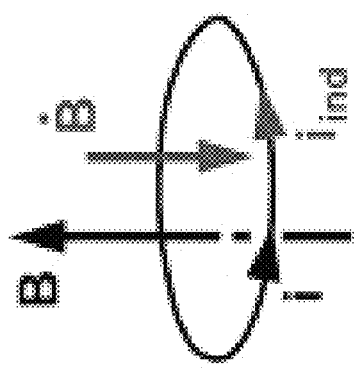
FIGS. 3A-3D show Lenz's law for one current loop being driven by AC.

In FIG. 3A, the current is flowing in a counter-clockwise direction, which results in a magnetic field up. The current is increasing in the counter-clockwise direction as signified by Ḃ pointing up. Using $$-\frac{\partial \vec{B}}{\partial t} = \nabla \times \vec{E},$$

the resulting emf is in the clockwise direction due to the negative sign. Thus, the induced current $I_{ind}$ is in the opposed direction as I, and more power must be used to overcome the induced current $I_{ind}$ to continue increasing I.

Figure 3B:
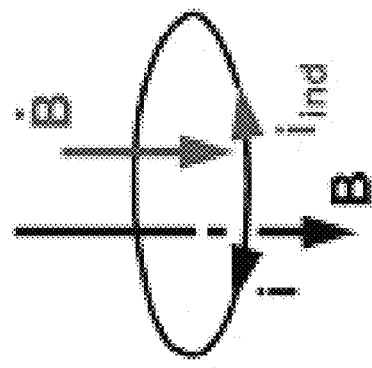
Figure 3D:
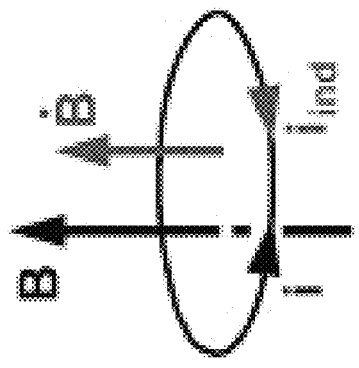
Figure 3C:
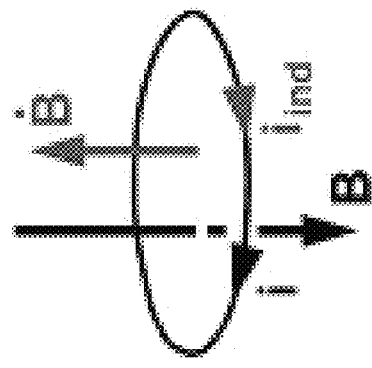

In FIG. 3B, the current I is still in the counter-clockwise direction, but the current I is decreasing, which results in the change $\vec{B}$ of the magnetic field being down. The induced current $I_{ind}$ attempts to maintain the current at the previous value, and thus is in the same direction. Accordingly, the emf is opposing the change in the current. FIGS. 3C and 3D show a similar result when the current I is clockwise.

Having covered the interrelationships between electric and magnetic fields and the magnetic vector potential $\vec{A}$, we will briefly describe the operation of transformers and motors based on the equations above. As a result of the interaction of two wire (coil) geometries, transformers, generators, and motors inherently couple, causing a Lenz reaction.

Due to the geometry of the coils described in the equations below, the inherent design of transformers, generators and motors is self-limiting. A change in current produces a time-varying magnetic field, which creates an electric field that opposes the change in the current. This phenomena is called Lenz law, and can also be characterized as: When an emf is generated by a change in magnetic flux of a circuit according to Faraday's Law, the polarity of the induced emf is such that it produces a current whose magnetic field opposes the change in the original magnetic field which produces it. This back-coupling, self-limiting behavior, as described by Lenz's law, is as follows.

FIGS. 4A-4D show block diagrams of four potential standard (coiled) wire interactions demonstrating the back-coupling, self-limiting behavior described in Lenz's law. All coil axes are in alignment. The four standard coil interactions represent Faraday's and Lenz's laws and demonstrate how the movement of one coil (the 'input'), with a magnetic field in and around it, induces a magnetic and electric field upon another coil (the 'output') that couple to, and are in direct opposition to the electric and magnetic fields (and movement) of the 'input' coil.

In FIG. 4A, the input coil is moved toward the output coil. The input coil has a current that creates a first $\vec{B}$ field in the down direction. If the input coil is moved down (or the current increases), the magnetic flux in the output coil increases, thereby resulting in an electric field that causes an opposite current in the output coil, thereby causing a second $\vec{B}$ field in the up direction. This effect is shown in the equation:

$$\frac{\partial \vec{B}}{\partial t} = \nabla \times \frac{\partial \vec{A}}{\partial t} = -\nabla \times \vec{E},$$

where the negative sign shows the $\vec{E}$ in the opposite direction. The second $\vec{B}$ field will be changing thereby causing an emf in the same direction of the original current, as shown with $$-\frac{\partial \vec{B}}{\partial t} = -\nabla \times \frac{\partial \vec{A}}{\partial t} = \nabla \times \vec{E}.$$

This induced emf in the input coil requires more power from the power supply for the input coil. The result is a continuous need to draw input energy/power from a source to facilitate the desired, and perceived power 'transfer' occurring between the source and load.

Also, the magnetic fields in the opposite direction attempts to repel the input and output coil to keep them at the same distance. For example, when the input coil moves toward the output coil, the two magnetic fields increase in opposite direction and the two coils repel each other. Similarly, if the current in the input coil is increased, the two magnetic fields will increase, thereby causing the two coils to repel each other.

In FIG. 4B, the input coil is moved away from the output coil. The input coil has a current (e.g., counterclockwise) that creates a first $\vec{B}$ field in the up direction. When the input coil is moved up (or the current decreases), the magnetic flux in the output coil decreases (shown by flux being down). An induced electric field causes a counter-clockwise current in the output coil, thereby causing a second $\vec{B}$ field in the up direction. The two magnetic fields in the same direction attract each other, thereby creating an attractive force that attempts to keep the coils at the same distance. If the current in the input coil decreased, the induced second $\vec{B}$ field will cause an attraction between the coils.

In FIG. 4C, the input coil is moved away from the output coil. The input coil has a current (e.g., clockwise) that creates a first $\vec{B}$ field in the down direction. When the input coil is moved up (or the current decreases), the magnetic flux in the output coil decreases. An electric field causes a clockwise current in the output coil, thereby causing a second $\vec{B}$ field in the down direction. The two magnetic fields in the same direction attract each other, thereby creating an attractive force that attempts to keep the coils at the same distance. If the current in the input coil decreased, the induced second $\vec{B}$ field will cause an attraction between the coils.

In FIG. 4D, the input coil is moved toward the output coil. The input coil has a current (e.g., counterclockwise) that creates a first $\vec{B}$ field in the up direction. When the input coil is moved down (or the current increases), the magnetic flux in the output coil increases. A resulting electric field causes a clockwise current in the output coil, thereby causing a second $\vec{B}$ field in the down direction. The two magnetic fields in the opposite direction repel each other, thereby creating a repelling force that attempts to keep the coils at the same distance. If the current in the input coil is increased, the induced second $\vec{B}$ field will cause a repelling between the coils.

As can be seen by these various scenarios, the change in current in the input coil affects an output coil, whose changing behavior affects the input coil. This interaction between the coils can adversely affect the operation of both coils and require energy or force to keep coils stationary.

The most common application in which coils are in motion relative to one another is in the design and operation of motors and generators. Yet, coils do not need to be in motion for back-coupling, or for the Lenz's reaction to occur, as evidenced by solid state transformers. In this case, two coils are wound upon a common core such that the magnetic field $\vec{B}$ changing through time stimulates the movement of one coil in relation to another. The AC provides a changing magnet field $\vec{B}$ in the input coil (primary of the transformer), which induces an emf upon the output coil (secondary of the transformer).

The geometry employed in conventional electrical systems creates a coupled relationship between electric and magnetic fields (and input and output coils), causing the self-limiting, input energy dependent behavior described above and by Lenz' law. While the Lenz's reaction is believed to be inherent to electromagnetic interactions, it is nothing more than the reflection of coupled magnetic fields being produced by the geometry of the wires and coils.

In the following section, the same Maxwell potential equations listed above are used to explain how the magnetic vector potential $\vec{A}$(MVPA) can be used to produce the skin effect, which in turn produces an electric field without producing an accompanying magnetic field. In doing so, the Lenz reaction is reduced or eliminated.

II. Divergence

As described above, in conventional system designs, conductors are used to conduct currents down the length of a wire, thereby producing a radial gradient in $\vec{A}$ that is perpendicular to the direction of $\vec{A}$ along the wire (i.e., $\vec{A}$ decreases radially from the wire and $\vec{A}$ is along the wire). This gradient in $\vec{A}$ provides an ensuing curl of the magnetic vector potential $\vec{A}$ (i.e., non-zero curl). As mentioned above, this curl leads to a magnetic field, which when time-varying causes a limiting effect in the conductor. If the curl can be reduced or eliminated, the limiting effect can be reduced, and the energy imparted into a first coil to wirelessly produce a motion of electrons in a second coil (not receiving electrons from the first coil) can be reduced.

To reduce or eliminate the non-zero curl in $\vec{A}$, embodiments can create a divergence in $\vec{A}$, e.g., in short bursts by using voltage pulses. The magnetic vector potential $\vec{A}$ is a continuously differentiable vector field in three dimensions with $\vec{A}=A_x\hat{x}A_y\hat{y}+A_z\hat{z}$. The mathematical representation for a divergence in the magnetic vector potential $\vec{A}$ is $\nabla\cdot\vec{A}$, which corresponds to $$\frac{\partial A_x}{\partial x}\hat{x}+\frac{\partial A_y}{\partial y}\hat{y}+\frac{\partial A_z}{\partial z}\hat{z}.$$

A divergence can be thought of as a point source.

Figure 5B:
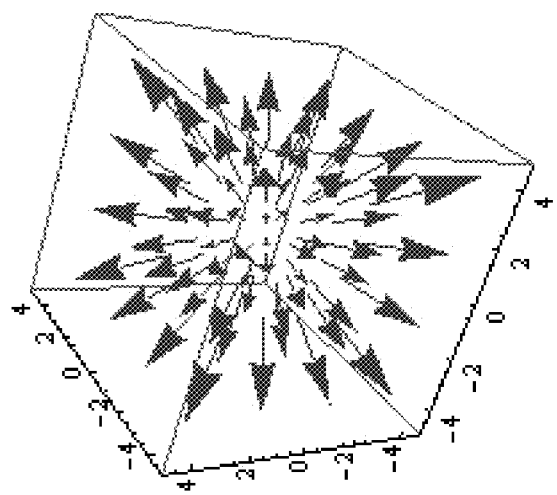
FIG. 5B shows a visual representation of the divergence $\nabla \cdot \vec{A}$ in 3D.
Figure 5A:
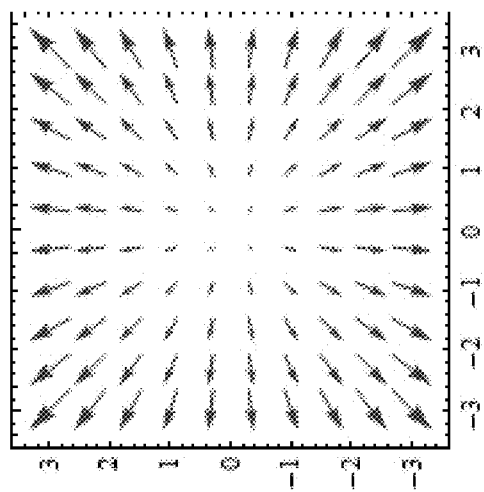
FIG. 5A shows a visual representation of the divergence $\nabla \cdot \vec{A}$ in 2D.

FIG. 5A shows a visual representation of the divergence $\nabla\cdot\vec{A}$ in 2D. The vertical and horizontal axes correspond to distances in the two dimensions. A point source of $\vec{A}$ is located at the origin position {0,0}. The arrows indicate a direction of the magnetic vector potential $\vec{A}$ at select positions. As can be seen, the arrows diverge away from the origin. The size of the arrows is for better visualization, and does not correspond to a magnitude.

FIG. 5B shows a visual representation of the divergence $\nabla\cdot\vec{A}$ in 3D. As with FIG. 5A, the point source is located at the origin position {0,0}. Note that there is no curl in the vector fields of FIGS. 5A and 5B. If a divergence in the magnetic vector potential $\vec{A}$ can be created, then the curl can be avoided, and a magnetic field $\vec{B}$ would not be created as a result of the diverging magnetic vector potential $\vec{A}$.

A divergence in the magnetic vector potential $\vec{A}$ can create an electric field without an accompanying magnetic field when the diverging magnetic vector potential $\vec{A}$ has a certain dependence on time. The relationship between $\vec{A}$ and $\vec{E}$ in this context is as follows:

$$\frac{\partial(\nabla\cdot\vec{A})}{\partial t}=\nabla\cdot\frac{\partial\vec{A}}{\partial t},$$

and since $$\vec{E}=-\frac{\partial\vec{A}}{\partial t},$$

we then have $$\frac{\partial(\nabla\cdot\vec{A})}{\partial t}=\nabla\cdot\frac{\partial\vec{A}}{\partial t}=-\nabla\cdot\vec{E}.$$

Thus, a divergent magnetic vector potential $\vec{A}$ that is changing over time equals a divergent electric field $\vec{E}$.

As described in the equations above, a time-varying divergent magnetic vector potential $\vec{A}$ creates a divergent electric field $\vec{E}$. There is no magnetic field $\vec{B}$ resulting from the $\vec{A}$ created from the skin effect because there is no curl (no vorticity) of the magnetic vector potential $\vec{A}$. This is because there is no curl in a diverging vector field.

III. Skin Effect

A time-varying divergence in the magnetic vector potential $\vec{A}$, which produces a divergent electric field $\vec{E}$, can be produced using various conductors including wires, plates, or spheres, using various materials, geometries, and designs. As stated above, conductors are presently used to conduct currents down the length of a wire, which produces a gradient in $\vec{A}$ and an ensuing curl of the magnetic vector potential $\vec{A}$ in the direction of the current flow. Typical operation is not designed to produce a skin effect, which, when optimized, can produce a divergence of the magnetic vector potential $\vec{A}$ when there are time-varying currents within conductive wires.

FIGS. 6A-6C provide cross-sectional views of a conductive wire 600 carrying different types of currents to illustrate the skin effect according to embodiments of the present invention. In FIG. 6A, the current remains constant and is DC. When the voltage is constant to provide a constant current, the current is composed of electrons moving along the wire throughout the entire wire. This is illustrated by the wire being completely shaded (region 610a), with shading indicating current flowing through the wire.

In FIG. 6B, the current changes moderately through time and is low frequency AC. The skin effect can be seen in FIG. 6B. Region 610b corresponds to where current can flow along wire 600. Region 620b corresponds to where no or minimal current is flowing along wire 600. The restriction of current to an outer ring of wire 600 when current is changing (i.e., AC character of current) is called the skin effect, so termed as the current stays near the skin (outer surface) of the wire.

In FIG. 6C, the current changes quickly through time and is high frequency AC. Region 610c corresponds to where current is flowing along wire 600. As one can see, region 610c is smaller than region 610a, as the frequency is higher for FIG. 6C. Region 620c corresponds to where no or minimal current is flowing along wire 600. Region 620c is larger than region 610b. The depth of the region through which current flows (i.e., 610b and 610c) is called the skin depth.

Besides a smaller region where current flows, the skin effect can cause electrons to move from the center of the wire outward to the surface of the wire, as is depicted by arrows 630. This motion will be discussed in more detail below.

Typically, the skin effect is viewed as a nuisance since the result is a smaller region through which current can flow. As the region for current flow is smaller, resistance increases. Thus, resistance varies inversely with the skin depth. Accordingly, standard techniques try to eliminate the skin depth. In contrast, embodiments described herein beneficially use the skin effect.

A. Cause of Skin Effect

Figure 7:
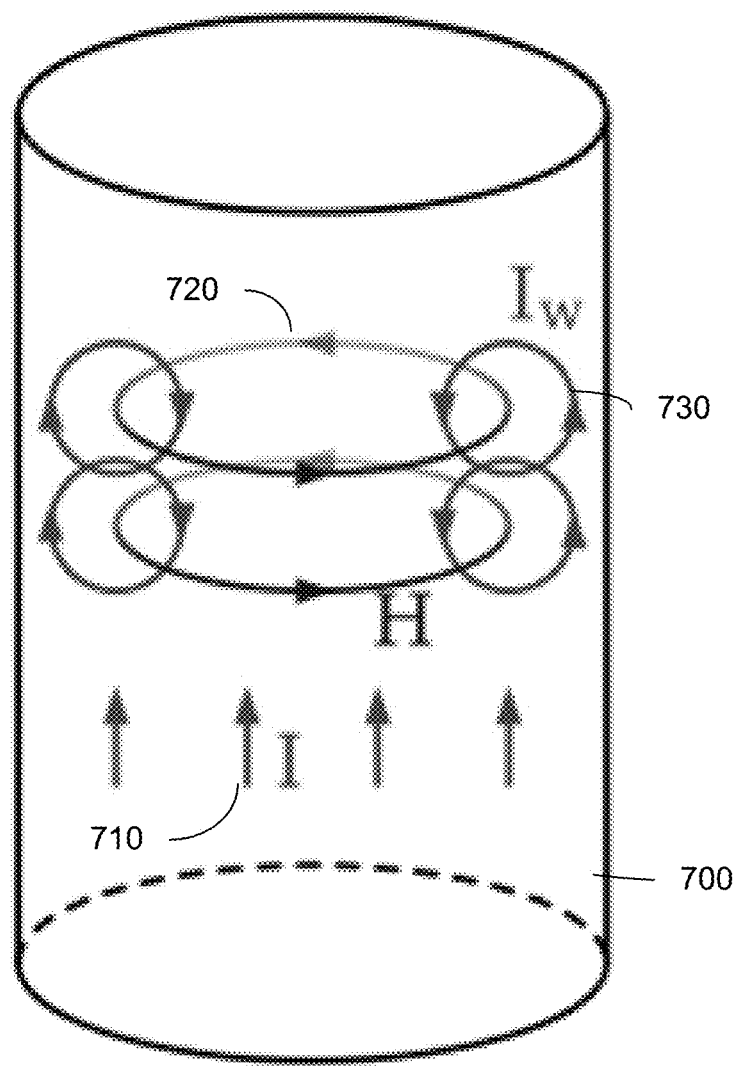
FIG. 7 illustrates eddy currents within a wire 700 that cause the skin effect. Wire 700 is shown with the current 710 (label I) in the up direction.

FIG. 7 illustrates eddy currents within a wire 700 that cause the skin effect. Wire 700 is shown with the current 710 (label I) in the up direction. Current 710 causes a magnetic field 720 (label H) to be generated within wire 700. As current 710 is time-varying, magnetic field 720 is also time varying, which generates an induced current 730 (labeled $I_w$). Induced current 730 (eddy currents) opposes current 710 toward the middle of wire 700, thereby causing no or minimal current to flow in the middle of wire 700.

The effect of induced current 730 decreases towards a surface of wire 700. Thus, there is an allowance of current flow at the surface. The higher the change (frequency) in current, the larger the induced current, and thus a smaller depth through which current will flow at the surface. Note that induced current 730 opposes an increase in magnetic field 720.

B. Skin Depth

The AC current density J in a conductor decreases exponentially from its value at the surface $J_S$ according to the depth d from the surface, as follows:

$$J = J_s e^{-\frac{d}{\delta}}$$

where $\delta$ is called the skin depth. J is the current density at depth d. $J_S$ is the current density at the surface of the wire. The value d is the depth from the surface in meters. The value $\delta$ is the skin depth in meters (or other common unit as d).

The skin depth is thus defined as the depth below the surface of the conductor at which the current density has fallen to 1/e (about 0.37) of $J_S$. In normal cases, the skin depth is well approximated for a given material operating at a given frequency as:

$$\delta = \sqrt{\frac{\rho}{\omega\mu_0}} = \sqrt{\frac{2\rho}{2\pi f \mu_0}},$$

where $\rho$ is resistivity of the conductor, $\omega$ is the angular frequency of current ($2\pi \times$ frequency), f is the frequency of the current, and $\mu_0$ is the permeability of free space.

Figure 8:
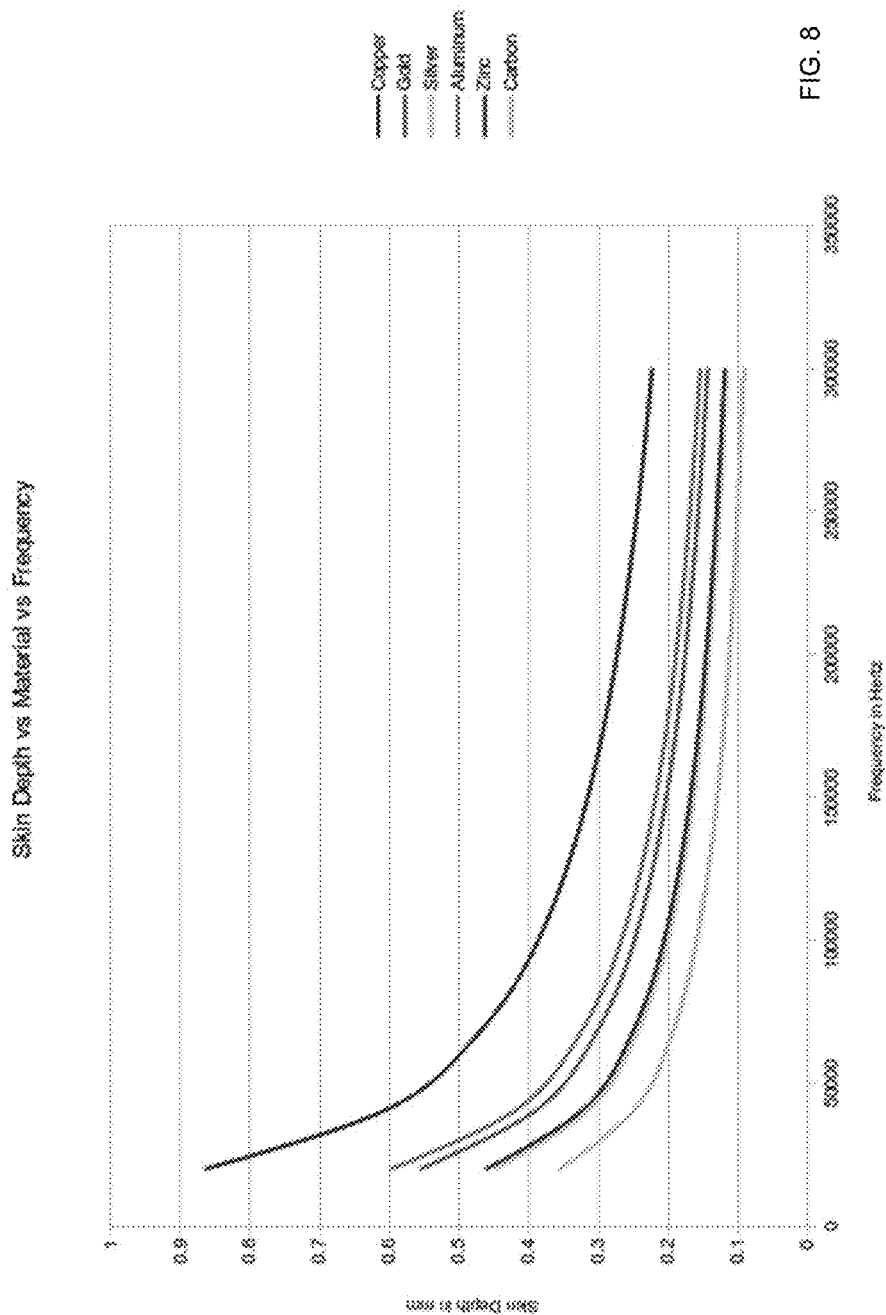
FIG. 8 shows a plot of skin depth vs. frequency.

FIG. 8 shows a plot of skin depth vs. frequency for copper, gold, silver, aluminum, zinc, and carbon. The vertical axis of skin depth in millimeters. The horizontal axis is frequency in hertz. As one can see, the higher the frequency, the smaller the skin depth. In some aspects, a small the skin depth is advantageous for embodiments, as there is more movement of electrons to the surface. Various types of metals can be used for the input conductor.

IV. Skin Effect and Pulses Creating Divergent A

As described above, time-varying currents are conducted only down the length of a conducting wire in conventional systems, as shown in FIG. 1A. In such systems, the skin effect is reduced or eliminated when possible by design. Unlike conventional electrical systems that are designed to produce coupled electromagnetic fields and reduce the skin effect, embodiments can create divergent electric fields without accompanying magnetic fields. To do this, embodiments seek to utilize, and can maximize, the skin effect in conductive wires to create a time-varying divergent magnetic vector potential $\vec{A}$, which in turn creates (generates) divergent electric fields without accompanying magnetic fields.

Because the skin effect is generated by time-varying currents, with dI/dt being the rate of change of current in the wire, a way to optimize the skin effect is to increase dI/dt. Additionally, to avoid accompanying magnetic fields, it is desirable to suppress current flow and electric and magnetic fields generated in a wire. A minimization of the conventionally coupled electric and magnetic fields is achieved by less overall current flow I through the wire.

To achieve a high dI/dt on minimizing current flow I, embodiments use voltage pulses with very short rise times (e.g., less than 30 ns). Ideally, the pulses are composed strictly of a rising edge and a falling edge, and thus can resemble a triangular waveform. A very high voltage can be used to obtain a very large increase in voltage over time, and thus a high dI/dt. The pulses can also be of short width (e.g., less than 1 nanosecond, 10 nanoseconds, 100 nanoseconds, a microsecond, 10 microseconds, or 100 microseconds) so as to limit an amount of current flowing through the conducting wire. The use of voltage pulses to provide a divergent magnetic vector potential is described below.

A. Movement of Electrons to Surface

During a rising edge of a voltage pulse, the voltage in the wire increases rapidly. This rapid increase in voltage causes a large dI/dt. Looking back at FIG. 7, the large dI/dt will cause a large dH/dt, which in turn leads to a large induced current 730. A large induced current can help to prevent an appreciable amount of current from flowing. And, induced current 730 causes electrons to flow toward the surface, as depicted by arrows of induced current 730 toward the surface. The induced current is less at the surface, and thus emf that would cause the electrons to move back toward the center is less than the emf pushing the electrons toward the surface. Accordingly, the more rapidly current changes through time, the more electrons diverge to the outer regions of the wire, as shown in FIGS. 6A-6C.

Figure 9C:
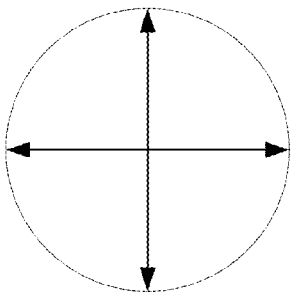
FIG. 9C shows a motion of electrons radially outward in a wire 900 during a rising edge of a second pulse.
Figure 9B:
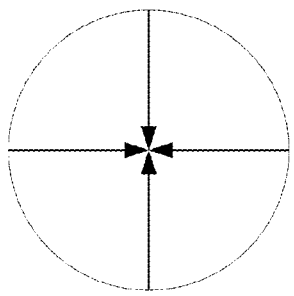
FIG. 9B shows a motion of electrons through the inward in wire 900 during a falling edge of the first pulse to a zero voltage.
Figure 9A:
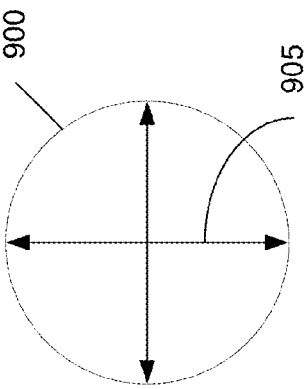
FIG. 9A shows a motion of electrons radially outward in a wire 900 during a rising edge of a first pulse.

FIG. 9A shows a motion of electrons radially outward in a wire 900 during a rising edge of a first pulse. During a rising edge, the large dI/dt causes a significant skin effect, which causes movement of electrons to the surface of wire 900. The radial outward motion is depicted with arrows 905.

FIG. 9B shows a motion of electrons inward in wire 900 during a falling edge of the first pulse to a zero voltage. At the end of the first pulse, the voltage is zero, and thus the change in current is zero. At the end of the first pulse, there is no skin effect as there is no voltage or current, which results in the electrons moving back to a state of equilibrium by some electrons moving towards the middle of wire 900. With the skin effect removed, the electrons are no longer being pushed toward the surface, which allows a movement towards the center that would be positively charged as a result of the radial movement during the rising edge. The rising edge and falling edge of the voltage pulses can be asymmetric. For example, the rising edge can increase faster than the falling edge decreases.

FIG. 9C shows a motion of electrons radially outward in a wire 900 during a rising edge of a second pulse. Since the electrons in the back towards the center after the end of the first pulse, the electrons can now move back to the surface when the rising edge of the second pulse occurs. In this manner, a divergence from the center of the wire can be generated.

The slew rate (increase in voltage over time) relates to a frequency. Thus, the skin effect can be maximized by increasing the slew rate. A large voltage over a short period of time can be used to increase the slew rate. Results below show that the total rise time can effect a strength of a voltage induced in an output circuit.

B. Radial Outward Time-Varying a (Movement to Surface)

Given the radial motion of the electrons in response to large and rapid voltage pulses, a radial magnetic vector potential $\vec{A}$ will result. Since a magnetic vector potential $\vec{A}$ is in a radial direction, $\vec{A}$ would have a nonzero divergence, and no curl. Thus, there would be no magnetic field as a result of the magnetic vector potential $\vec{A}$.

FIG. 10A shows a cross-sectional view of a wire 1000 with a radial magnetic vector potential 1010 produced from voltage pulses according to embodiments of the present invention. The arrows represent the divergent magnetic vector potential $\vec{A}$ around the wire. As explained above, the electrons moving in the magnetic field will be pushed to the surface. Thus, a radial current will exist toward the edge, thereby generating the radial outward $\vec{A}$.

FIG. 10B shows a perspective view of wire 1000 and the radial magnetic vector potential 1010 having a nonzero divergence according to embodiments of the present invention. As one can see, magnetic vector potential 1010 does not have a curl, and thus would not generate a magnetic field, which can cause a limiting effect on the production of voltage pulses in wire 1000. In this manner, power is not wasted having to overcome such a magnetic field, and operation can be more efficient.

Magnetic vector potential 1010 can be considered to be longitudinal if it does not have a curl. Also, magnetic vector potential 1010 is not part of a transverse wave of coupled electric and magnetic fields. The magnetic vector potential varies in a direction of propagation of the magnetic vector potential. The longitudinal wave increases and decreases in correspondence to voltage pulses, where $\vec{A}$ decreases to zero between pulses. Accordingly, the radial expansion of electrons in wire 1000 can induce a longitudinal wave in magnetic vector potential.

When done properly, the rapidly time-varying divergence in the magnetic vector potential $\vec{A}$ around the wire will create a high voltage electric field extending directly out of the wire perpendicularly in a 360 degree radius as shown in FIGS. 10A and 10B. This radial magnetic vector potential is time varying at a rate consistent with the voltage pulses. This time-varying radial magnetic vector potential can create a radial electric field extending from wire 1000.

The oscillation of the magnetic vector potential can be controlled to provide a desired electric field, which can be used for a variety of purposes (e.g., inductive charging and communications). For example, the slew rate of the voltage pulses can be used to determine an instantaneous magnitude of the electric field, and the duration of the rise time can correspond to an amount of time that an electric field is generated. Further, the duty cycle of pulses can be used to control an average magnitude of the resulting electric field. As the benefit is obtain in the edges of the pulse, the width of the pulse can be kept small so that current does not flow in the input circuit (conductor).

A time variance of the electric field can be dictated by second and higher derivatives in the $\vec{A}$ generated during a rise time of the voltage pulse. The electric field has a same direction or opposite direction, depending on how $\vec{A}$ is changing over time (e.g., increasing or decreasing). For example, if $\vec{A}$ is increasing over time, then the electric field would be in the opposite direction. If $\vec{A}$ is decreasing over time, then the electric field would be in the same direction. And, the pattern of pulses can determine a time variance of the electric field. For example, pulses can be sent in bursts, followed by no pulses for a specified duration, thereby providing a time variation of the electric field.

C. Reduction of Current Along Wire

As described above, it is desirable to limit the amount of actual current along the wire, as such current causes a magnetic field that must be overcome. If the voltage pulse has sufficient properties (e.g., pulse width and amplitude), the current never reaches an appreciable value because the current is increasing over a very short period of time. The voltage begins to decrease before an appreciable amount of current can flow, and thus a generation of an opposing magnetic field is avoided. Accordingly, the generation of a short voltage pulse is beneficial. A voltage pulse can be generated using a switching mechanism to obtain a short width for the pulse.

The properties of the rising edge can dictate an amount of radial movement of electrons, and thus an amplitude of the radial magnetic vector potential. The falling edge would be fast enough so that the voltage reaches zero before a next voltage pulse is to be provided. The rate of the voltage pulses can be selected to provide an electric field with a desired property. A pulse width would limit maximum frequency of the voltage pulses.

The biggest change in current occurs between the time there is no current and when the current starts to flow. This is when dI/dt is highest. In an inductor (all wires have some aspects of inductance), dI/dt starts off at a maximum, and then exponentially falls off to zero, if a constant current was ever achieved. Thus, the desirable high dI/dt can be achieved when I is a zero, which is also desirable. Further, the skin effect impedes the generation of current, as do other capacitive and inductive effects at the initial moment that voltage increases from zero. For instance, once the electrons begin to move, the electrons encounter eddy currents and a force that pushes the electrons to the surface. Thus, in the very short period of the rising edge of the pulse, an appreciable amount of current does not flow.

The reduction in current can also be thought of as occurring due to the opposing emf of the self-inductance of the wire: emf=−L×dI/dt. When there is a higher dI/dt, the opposing emf is larger. The pulses can provide a large dI/dt. Also, if the inductance is higher (e.g., in a solenoid), then the current can be reduced to a greater extent.

A purpose of having a short voltage pulse is to stop generation of current when the amount of current becomes appreciable. At that moment, the voltage pulse can stop, e.g., by opening a switch in the circuit. Thus, an appreciable magnetic field will not be generated. And, an appreciable amount of energy is not imparted to the inductor, which would otherwise provide a massive inductive kickback in the voltage. In this manner, the amount of energy used can be minimized. And, the use of pulses can continue to provide the dI/dt, without the ultimate energy used once a current starts.

V. Pulses

Embodiments can use fast transition DC voltage pulses. The voltage pulses can be designed to maximize the skin effect in bursts. The pulses can be designed with desirable rise times, amplitudes, and pulse rates (i.e., the number of pulses per unit time). As described above, voltage pulses can cause electrons to move to the surface, but at the end of the pulse, the electrons move back. This effect can continue through a series of pulses, which can create the diverging magnetic vector potential, and a resulting electric field. The pulses can be periodic, non-periodic, periodic for some time segments, have a continuous change (increase or decrease) from one pulse to another (or between two sets of pulses), and other patterns. Control signals can be used to control the pattern of pulses.

A. Slew Rate

The slew rate of a pulse is the amount of increase in voltage per unit time. To provide a large dI/dt, a high slew rate is desired. The high slew rate acts as a high frequency, which leads to an increased skin effect and a larger magnetic vector potential. Thus, a high slew rate can maximize the skin effect, which can also lead to greater efficiency (i.e., less appreciable current flowing along the wire). A low slew rate can allow a current to begin to build up within the wire. Similarly, a long rise time can allow a current to begin to build up.

In one embodiment, a rise time of less than 30 ns can provide a sufficient magnetic vector potential for transmitting communication signals and for charging, or otherwise powering a load. The amplitude and resulting slew rate can be specified to provide sufficient voltage to power a load in an output circuit (e.g., an output coil) that is positioned to use the electric field resulting from the divergent magnetic vector potential. In various embodiments, the slew rate can be equal to or greater than 1 V/30 ns, 150 V/μs, 10 V/ns, 50 V/ns, or 100 V/ns.

The rising edge and falling edge of the voltage pulses can be asymmetric. For example, the rising edge can increase faster than the falling edge decreases. A slower change in voltage for the falling edge can reduce the magnetic vector potential generated on the falling edge, and thus reduce any electric field from the falling edge. The switching mechanism can be used to control the rising and falling edge of the voltage pulse, as a switch does not happen instantaneously. For example, an insulated-gate bipolar transistor (IGBT) can have a longer falling edge than rising edge.

B. Pulse Rate

The pulse rate corresponds to the number of pulses per unit time. The pulse rate would affect the modulation of the magnetic vector potential $\vec{A}$ over time. Thus, the pulse rate affects the frequency of $\vec{A}$ which then affects $$\frac{\partial \vec{A}}{\partial t},$$

which in turn affects the resulting electric field. Thus, how often those pulses are coming through and potentially the rise time of that pulse is going to affect how the $\vec{A}$ field is changing over time. The pulse rate can be used to determine the primary frequency at which the $\vec{A}$ field is modulated. In various embodiments, the pulse rate can be equal to or greater than 1 kHz, 100 kHz, 500 kHz, 1 MHz, 1 GHz, or higher. The pulse rate of the series of input voltage pulses can provide a desired frequency for the time-varying magnetic vector potential.

C. Width

Embodiments can strive to use pulses having as small a width as possible. In various embodiments, a maximum width of a pulse is less than 100 μs, 10 μs, 1 μs, 100 ns, 10 ns, and 1 ns. As explained above, a short pulse width can help to reduce the amount of current along the wire. The width can be sufficiently small that the resulting pulse is extremely narrow and triangular or Gaussian in nature (i.e., no or little time of being at a constant voltage at the top of the pulse). The pulse width would also impact the maximum frequency for the pulse rate. An example pulse is provided in FIG. 15. An appropriate pulse width can depend on the conducting material used, the geometry of the input circuit (e.g., a type of coil), and a length and diameter of the input conductor, as well as the amplitude of the pulse. For example, a smaller amplitude can allow for a longer width before significant current is reached.

D. Amplitude/Voltage

The amplitude can impact the amplitude in the induced voltage in the output circuit. As is described below in section X, an increase in the amplitude of the input pulse in the input circuit affects the amplitude of the output pulse in the input circuit. Further, significant and unexpected increases can be seen at certain amplitudes.

To obtain a high and sustained slew rate, the total voltage achieved by the pulse would be high (e.g., 50 V). If the voltage was only 5 or 10 V, then the maximum voltage would be achieved in a time less than 1 μs, and current would begin to flow when the maximum voltage is reached and sustained (i.e., if the pulse width was not sufficiently small). Other embodiments can use higher voltage, such as 500 volts, 1,000 volts, or 10,000 volts. The higher voltage allows the slew rate to be higher and affect the time dependence of $\vec{A}$. Thus, the amplitude can contribute to achieving a maximum dI/dt, and increasing the generated electric field.

Additionally, the higher amplitude of applied voltage can generate a higher slew rate in reaching the desired voltage, which can be less than the applied voltage. Typically, the pulse would reach the voltage of the power supply before a switch could open (i.e., cutting off the applied voltage). But, in some embodiments, the voltage in the wire may not reach the power supply voltage, but just reach a desired voltage, depending on the switching speed and the applied voltage. Having the voltage of the power supply being larger than amplitude of the voltage pulses can provide a higher slew rate. For example, the initial increase from zero volts can be very large. As a voltage increases in the wire, the rate of increase would become smaller as the amplitude of the logical pulse nears the voltage of the power supply. Thus, to reach the voltage of the power supply, the slew rate would decrease, which would show up as a rounding of the amplitude of the pulse. And, the power supply would have to be connected for a longer time, which could result in an appreciable amount of current along the wire.

Thus, having a power supply with the maximum voltage higher than an amplitude of the voltage pulse can maximize the resulting magnetic vector potential and minimize the current along the wire, and the resulting magnetic field. The amplitude of voltage pulse would correspond to a length of time that the power supply is connected via a switching mechanism. The falling edge of the pulse would have a shape that is dictated by the switching mechanism that opens to end the pulse. Since a switch is not perfectly instantaneous, the falling edge would have a certain decay shape, and the rising edge of the pulse would have a certain rising shape. Once the switch is completely open (i.e., circuit is separated from the power supply), the voltage can be effectively zero in the circuit, depending on the decay rate and the time until a next pulse.

E. Optimal Parameters

As described above, the properties of voltage pulses can impact the desired production of the divergent magnetic vector potential, and can reduce the unwanted generation of an opposing magnetic field that would result from current along the wire. In general, it is desirable to have pulses be short, have a large amplitude, and increase rapidly to obtain a short rise time. The optimal values can be expressed as a threshold value, above which or below which the values are desired. Thus, the optimal values can be a range determined by minimum or maximum values, where any value in the range is desired. The optimal values can depend on the properties of the system, e.g., a gauge of the wire and a shape of the wire (e.g., whether in a solenoid or straight wire).

In typical pulse operations, the increase in the voltage is so slow that an appreciable amount of current will be produced during the pulse. In contrast, voltage pulses produced by embodiments of the present invention can have properties that reduce or eliminate appreciable current.

In some embodiments, an optimal value of a maximum pulse width is less than 1 µs (e.g., less than 50 ns, 1-5 ns, or less than 1 ns). Such a width can cut off the pulse before an appreciable amount of current can begin to flow. The pulse width can be controlled with a switching mechanism. This allows for the utilization of the generated dI/dt while minimizing I. Slew rates greater than 10 V/ns, 50 V/ns, or 100 V/ns can be used. Rise times can be less than 30 ns, 20 ns, 10 ns, 1 ns, or 500 picoseconds.

In some embodiments, the voltage of the power supply can be at least 50 V (e.g., when the divergent magnetic vector potential and resulting electric field are used for communications) or at least 150 V (e.g., when the divergent magnetic vector potential and resulting electric field are used for power generation). Power supplies can have voltage of 500 V or upwards of 1000 V and 1500 V. Even when using 32 gauge wire, the use of very short pulses would still not short the wire as an appreciable amount (e.g., less than 50 micro amps or less than 1-3 milliamps) of current does not flow.

F. Power Usage and Curl-Free Magnetic Vector Potential

As described above, embodiments can apply a high slew rate over a short rise time to a piece of wire to generate a skin effect. The skin effect acts to limit the current rise in the wire, which uses less power. The desired effect is the faster rise time of the voltage pulse and fast drop, and not a sustained voltage that would be characteristic of power input. Thus, it is desirable to quickly reduce the pulse back down to zero, once the pulse reaches the desired voltage.

The effective resistance of the wire (e.g., in a coil geometry) is very high during the very short pulse because there is such a quick pulse that the effective reactance prevents the current from becoming large during the short time of the rising voltage of the pulse. Since the current flow during the voltage rise is minimal (e.g., due to capacitive effects, induced eddy currents, and other inductive effects), the power usage is relatively minimal.

And, the curl-free magnetic vector potential does not create a magnetic field, which would otherwise cause inefficiencies in wireless charging or wireless communications. And, the electrons that are going out radially do not encounter a large resistance moving towards the surface. That way, embodiments can actually get more of an appreciable current that is moving towards the surface than going down the wire.

VI. Dependence of A and E on Pulses

As the pulses are used to generate the time-varying and divergent magnetic vector potential $\vec{A}$, which corresponds to an electric field emanating from the conductor (e.g., straight wire or coil), the pulses can be used to create a desired $\vec{A}$ and $\vec{E}$. For example, a time variance of the electric field can be determined by second and higher derivatives in the $\vec{A}$ generated during a rise time of the voltage pulse. Thus, the exact shape of the rising edge of the voltage pulse can impact the time dependence of $\vec{A}$, and therefore impact the time dependence of $\vec{E}$ since $$\vec{E} = -\frac{\partial \vec{A}}{\partial t}.$$

The pattern (rate) of pulses can determine a time variance of the electric field. For example, during a voltage pulse, the electric field can exist and have a strength that is related to a slew rate of the pulse. When the voltage pulse drops back to zero, the magnetic vector potential $\vec{A}$ will be zero, and the electric field will be zero. Thus, the time dependence of the voltage pulses impacts when an electric field is created and when it is not. Therefore, the voltage pulses provide pulses of electric field. The width and rate of the pulses width can determine when an electric field is produced, as they determine when no electric field is generated (i.e., when the voltage pulse is zero). A duty cycle of the voltage pulses is a function of the width and the pulse rate. A higher overall duty cycle can provide a longer amount of time that an electric field is being generated. But, the pulses width should be kept relatively low so as not to produce an appreciable current.

When the electric field is being produced, current can be produced in an output coil that is arranged to receive the electric field pulses. The electric pulses can provide bursts of current in a load in the output coil. If the pulse rate is high enough, the current in the load might appear relatively constant, or at least provide a same functionality as a constant electric field. The strength of the overall electric field for driving the load can be controlled by the duty cycle, and thus controlled by the width of the pulses and the pulse rate. In various embodiments, a duty cycle of 20%, 10%, 5%, 1%, 0.5%, 0.1%, or less can be used.

Further, if a high pulse rate is possible, a lower applied voltage may be used. For example, if the pulse rate could approach the rise time of a pulse, the width of a pulse could be reduced, with a corresponding increase in the pulse rate, without the total generated electric field being compromised. With the pulse width smaller, the total time for the rising edge can be less, and thus a total voltage achieved being less.

The pulses can be provided in a pattern, e.g., not always with uniform periodicity. For example, a series of pulses can be applied (e.g., over 10 microseconds), followed by 3 microseconds of no pulses. The pattern can be of any duration of pulses being applied and not being applied. Pulse rates can change during a period of applying pulses, e.g., pulses could increase in frequency of decrease in frequency in a continuous fashion (e.g., each pulse occurring faster or slower than the last one). All of this variation can affect the overall time dependence of the electric field being generated. This, time dependence can be used to encode data, which can be decoded, e.g., via current in an output coil. As examples, the encoding can be based on amplitude modulation or frequency modulation. As another example, a series of pulses could be a binary 1, and a pause in pulses could be a binary 0.

Further, the electric field would decrease with increasing distance from the conductor. The electric field would decrease as $1/r^2$, where r is the distance from the conductor.

VII. Input Coils

In some embodiments, the conductor to which the voltage pulses are provided forms a coil, e.g., a solenoid or toroidal coil. Such coils can provide additional reactance for reducing current, due to capacitive and inductive effects of the coil. Also, the shape of magnetic vector potential and resulting electric field would differ based on the geometry of the input coil. The geometry for the input coil can also be chosen so as to reduce or eliminate interaction with any fields created by a current in the output coil that is induced by the electric field from the input coil.

As described above, the resulting reactance for a coil can be larger than a straight wire. Given the high reactance, a high voltage (e.g., 1,000 or 10,000 V) can be used for the voltage pulses without burning of the coil. The more turns within the coil can provide an increase in the inductance, limiting the current along the wire. The wire of the coils (or other input conductors) can have a length of at least 1 foot, 10 feet, 100 feet, 500 feet, 1,000 feet, or longer. As examples, the diameter of the wire of the coils can be 20 AWG, 25 AWG, 30 AWG, 35 AWG, or 40 AWG.

A. Toroidal Solenoid

FIG. 11A shows a side view of a toroidal coil 1100 with a radial magnetic vector potential 1110 produced from voltage pulses according to embodiments of the present invention. FIG. 11B shows a perspective view of toroidal coil 1100. The magnetic vector potential 1110 is diverging as shown. This is in sharp contrast to the geometries of the magnetic vector potential $\vec{A}$ around a toroidal coil in conventional designs (see FIGS. 2A and 2B). As one can see, there is no curling or voracity in the magnetic vector potential $\vec{A}$ radiating from the coil. The resulting electric field $\vec{B}$ would be in a corresponding direction as magnetic vector potential 1110. The magnetic field of FIGS. 2A and 2B is absent.

B. Cylindrical Solenoid

Figure 11C:
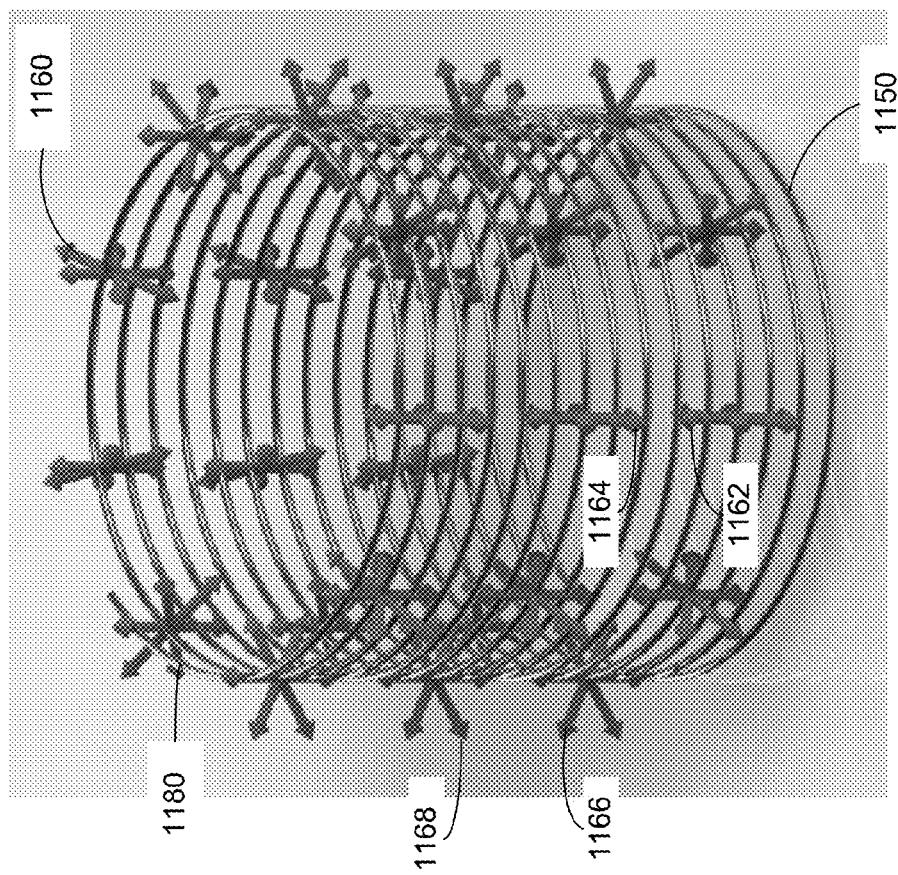
FIG. 11C shows a solenoid 1150 from which a radial magnetic vector potential 1160 is produced according to embodiments of the present invention.

FIG. 11C shows a solenoid 1150 from which a radial magnetic vector potential 1160 is produced according to embodiments of the present invention. Magnetic vector potential 1160 is shown radially emanating from various points on the coil of solenoid 1150. Magnetic vector potential 1160 can be produced, as described above, by applying voltage pulses.

Magnetic vector potential 1160 from windings that are next to each other can cancel out in some directions, as the magnetic vector potential 1160 is produced in all directions. For example, arrow 1164 points down and arrow 1162 points up. For points on windings that are just above and below each other, the magnetic vector potential in the vertical direction (i.e., up and down) would be at substantially the same strength, and thus cancel each other out.

Further, arrows 1166 and 1168 can cancel each other out in the vertical direction, leaving only a horizontal component. Accordingly, the resulting magnetic vector potential at points radially distal from the coil can be solely in the horizontal direction. For example, a point in a plane that bisects the cylindrical solenoid can have components of magnetic vector potential 1160 only in the horizontal direction.

Points in planes that are further up or down from the bisecting plane can have components of magnetic vector potential 1160 in the vertical direction as such a plane would be offset from the middle, and thus more lines of magnetic vector potential 1160 would be received in the direction of the offset. For example, a first point near the top of solenoid 1150 would have more lines of magnetic vector potential 1160 reach it from points below the first point. Thus, there would be some electric filed in the up direction.

Points that are directly above a top winding 1180, would have a vertical component to magnetic vector potential 1160, as there is no canceling component from another winding. A cylindrical coil and a toroidal coil are examples of a circular coil.

VIII. Output Circuits

An output circuit can be positioned to receive the electric field resulting from the time-varying magnetic vector potential produced by the input circuit. Various combinations of output circuits and input circuits are now described.

A. Basic Circuit

Figure 12:
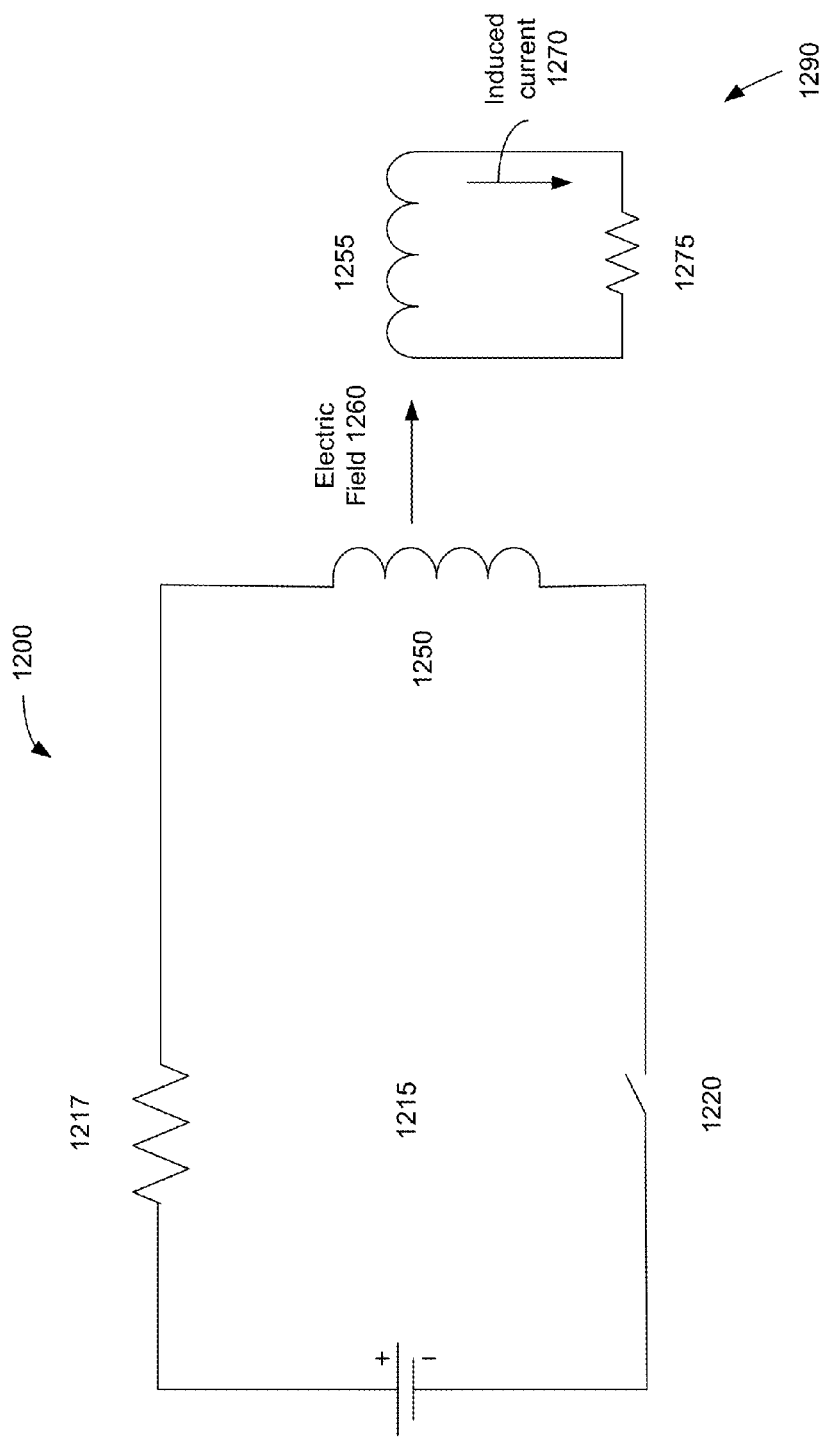
FIG. 12 shows a block diagram of a basic circuit 1200 according to embodiments of the present invention.

FIG. 12 shows a block diagram of a basic circuit 1200 according to embodiments of the present invention. The block diagram can correspond to an apparatus according to embodiments of the present invention. Circuit 1200 includes a voltage source 1215, a resistor 1217, an inductor 1250 (e.g., a solenoid or toroidal coil), and a switch 1220. Switch 1220 can be controlled by a controller to open and close to provide voltage pulses to inductor 1250. Resistor 1217 can represent resistance in a wire between voltage source 1215 an inductor 1250. The voltage pulses can create a curl-free magnetic vector potential as described above. Switch 1220 can be composed of various components and use various techniques for providing the voltage pulse, such techniques include magnetic pulse compression, MOSFET switched capacitors, and using a junction recovery diode. Various types of a solid-state switch can be used.

The curl-free magnetic vector potential can be used to induce current in a separate circuit 1290, without limiting effects of the magnetic field that would normally be created by magnetic vector potential that had a curl. Circuit 1290 can include another inductor 1255 or any load to be driven. Output circuit 1290 also include a storage device, such as a capacitor bank or other type of battery. Inductor 1255 (or other output conductor) can at least partially reside in a plane and that extends away from inductor 1250 (or other input conductor). Thus, output circuit 1290 can at least partially reside in the plane and extends away from the input conductor in the plane.

In some embodiments, the output circuit includes a first output coil in the plane of the input circuit (e.g., in input conductor or an input coil). The first output coil can include first windings lying in the plane on a first side of the cylindrical solenoid such that a first axis of the first output coil extends away from the cylindrical solenoid, e.g., the first output coil is perpendicular or has a component perpendicular to an axis of an input solenoid. The output coil can be a first cylindrical solenoid and the input coil can be a second cylindrical solenoid.

B. Pancake Coil

Figure 13A:
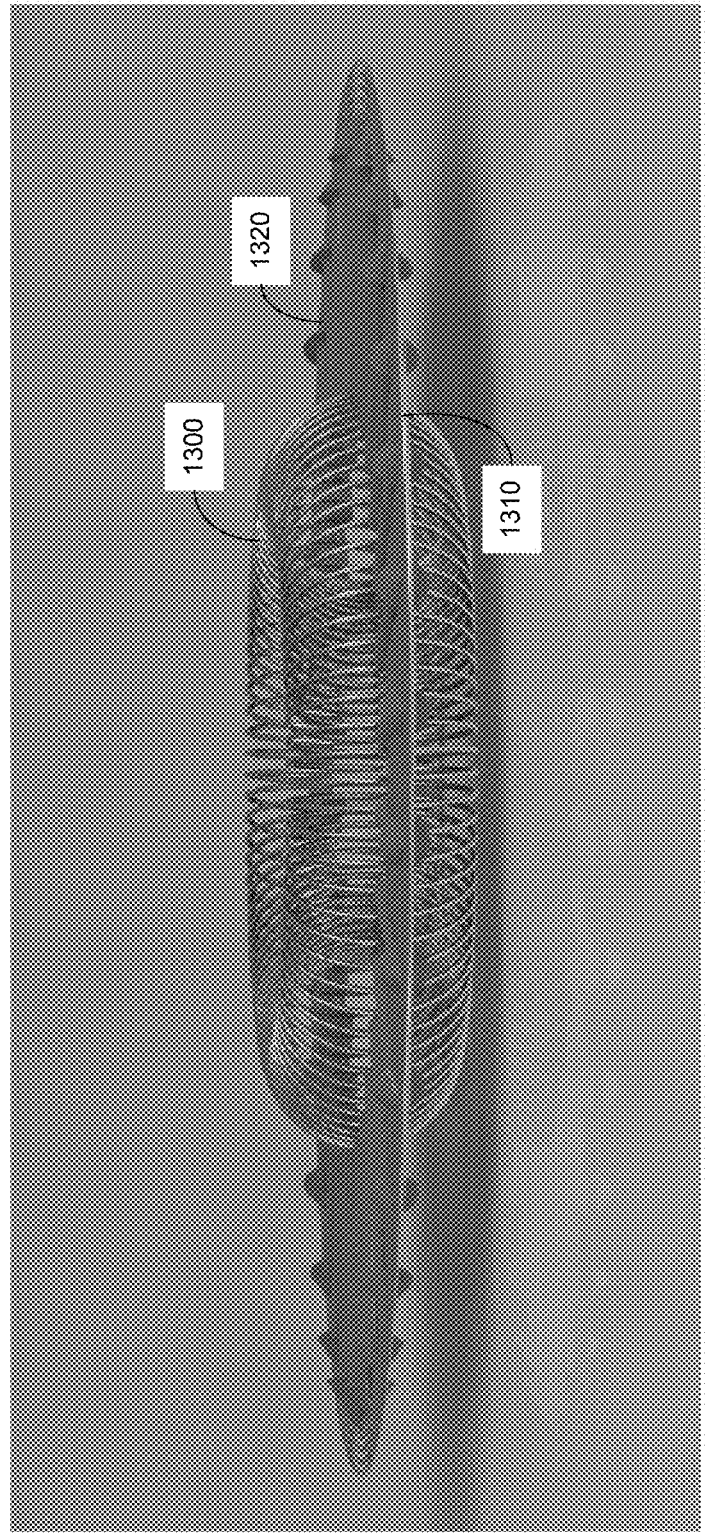
FIG. 13A shows an input toroidal coil 1300 and an output pancake coil 1310 according to embodiments of the present invention.

FIG. 13A shows an input toroidal coil 1300 and an output pancake coil 1310 according to embodiments of the present invention. Input toroidal coil 1300 can be driven with voltage pulses, as described herein. The resulting magnetic vector potential is shown in FIGS. 11A and 11B. In FIG. 13A, the magnetic vector potential is shown only in the plane of pancake coil 1310. The plane resides in a center of coils of toroidal coil 1300.

As shown, pancake coil 1310 bisects toroidal coil 1300. Pancake coil 1310 at least partially resides in a plane of toroidal coil 1300 and extends away from toroidal coil 1300 in the plane. The output windings of pancake coil 1310 are circular in the plane with successive windings extending father away from toroidal coil 1300.

Figure 13B:
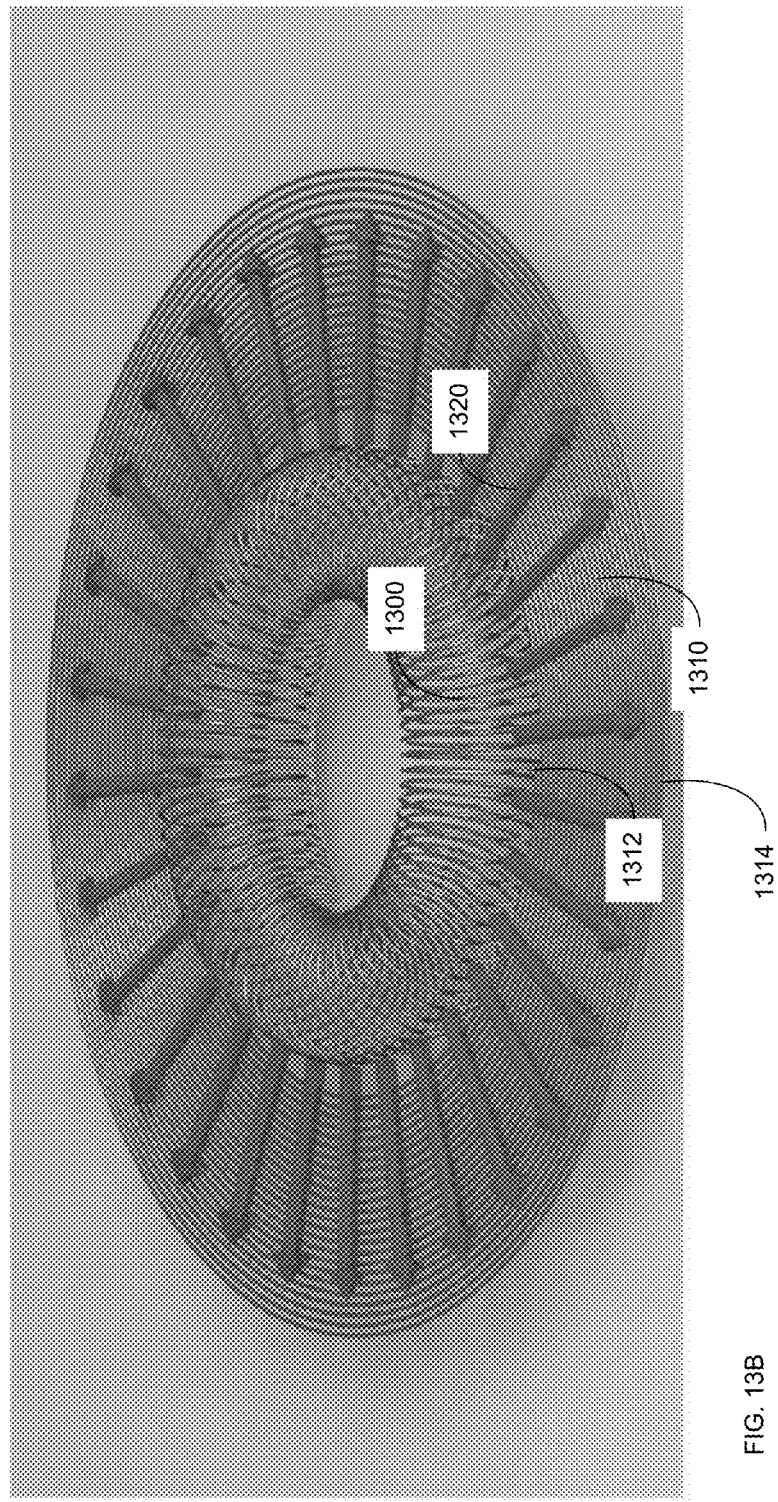
FIG. 13B shows a perspective view of input toroidal coil 1300 and output pancake coil 1310 according to embodiments of the present invention.

FIG. 13B shows a perspective view of input toroidal coil 1300 and output pancake coil 1310 according to embodiments of the present invention. Output pancake coil 1310 forms rings that increase in diameter with increasing distance from input toroidal coil 1300. A first lead 1312 of output pancake coil 1310 is closest to input toroidal coil 1300. The conductor of output pancake coil 1310 forms circles around input toroidal coil 1300 with the diameter increasing with each new circle. A second lead 1314 is at the farthest point away from input coil 1300. First lead 1312 can be a start of an inner ring of the pancake coil that is a first ring that receives the time-varying magnetic vector potential. The time-varying magnetic field can propagates radially from an inner coil having first lead 1312 to an outer coil having second lead 1314.

The time-varying magnetic vector potential 1320 creates an electric field having a same direction or opposite direction, depending on how magnetic vector potential 1320 is changing over time (e.g., increasing or decreasing). For example, if magnetic vector potential 1320 is increasing over time, then the electric field would be in the opposite direction. If magnetic vector potential 1320 is decreasing over time, then the electric field would be in the same direction. As the electric field changes over time, the current would also change over time, and thus be alternating current.

The different rings of output pancake coil 1310 have a different potential (voltage) as a result of the electric field. Thus, first lead 1312 and second lead 1314 are at different voltages, and current can flow between the two leads. For example, the electric field may get turned on and off due to the voltage pulses, but the accumulated effect creates a current. The direction of current depends on whether one takes a standard view positive charges moving, or the physical view of negative charges.

This current can cause a magnetic field in a standard manner as appreciable current flows over time. For example, output coil 1310 is shown to be wound in a clockwise direction (other embodiments can be wound in a counterclockwise direction). Thus, the current (i.e., from a higher voltage to lower voltage) would have current in a clockwise or counterclockwise direction. For clockwise current, a resulting (output) magnetic field $\vec{B}$ around the wires of the output coil would be circular around the wires, with a downward direction on a near side of input coil 1300 and an upward direction on the far side of input coil 1300. For counter-clockwise current, the resulting magnetic field $\vec{B}$ around the wires of the output coil would be circular around the wires, with an upward direction on a near side of input coil 1300 and a downward direction on the far side of input coil 1300.

Since an appreciable magnetic field is not created by input coil 1300, there is no input magnetic field for the output magnetic field to couple back to. This limits an interaction between the coils, which would otherwise provide limiting effects. Further, for the toroidal coil, any input magnetic field that might be created would be confined to an interior of the toroidal coil. And, if any current was flowing in toroidal coil 1300, the input magnetic field from the torpid would be in the same direction as the rings of pancake coil 1310. Thus, the output magnetic field would be perpendicular to input, magnetic field, thereby reducing any coupling.

C. Other Output Circuits

In another embodiment, the input coil can be a cylindrical solenoid. The output coil can be flat, e.g., on one side of the cylindrical solenoid. In one implementation, the output coil can have a zig-zagging shape, like that of a radiator. If this arrangement, there can be two output coils, e.g., on opposite sides of the input cylindrical solenoid. The output coils can be in a plane that bisects the input cylindrical solenoid, e.g., in a similar manner that pancake coil 1310 bisects input coil 1300. Thus, the plane can bisect the plurality of input windings of the cylindrical solenoid. Accordingly, the output circuit can include a cylindrical coil of circular windings having an axis through the circular windings, with the axis perpendicular to the axis of the input cylindrical solenoid (e.g., as shown in FIG. 12).

Accordingly, the output circuit can include a first output conductor (e.g., a coil) in the plane, where the first output coil includes first windings lying in the plane on a first side of the cylindrical coil. And, a second output coil can include second windings lying in the plane on a second side of the cylindrical coil such that a second axis of the second output coil extends away from the cylindrical coil. In various embodiments, there can be two output circuits, one for each output coil, or the two of the coils can be part of a same output circuit.

In another embodiment, the output circuit includes a wire that extends from the input conductor along a plane. For example, a wire could extend radially outward perpendicular to an input wire, an input toroidal coil, or an input cylindrical coil.

IX. Power

Looking back at FIG. 12, electric field 1260 can induce a current 1270 that is used to drive a load 1275. Thus, inductor 1250 (or other input conductor) can be situated so that a current is induced in output circuit 1290 by electric field 1260. As examples, the input conductor can be situated by or along a surface, in a pad, adjacent a receptacle for a device containing output circuit 1290.

As an example, load 1255 can correspond to a power consuming circuitry, such as sensors, a battery, or a processor. Thus, the battery can be charged from the current. Electric field 1260 has a same direction or opposite direction as the magnetic vector potential from which the electric field is generated, depending on how the magnetic vector potential is changing over time. As the electric field changes over time, induced current 1270 would also change over time, and thus can be alternating current.

Output circuit 1290 can be used for communications applications. The induced signals in output circuit 1290 can include data signals, e.g., based on the pulse rate, existence of pulses during a time period, etc. The signals can be detected via any suitable technique, e.g., as voltages across a load. The voltages for communications can be less than for power and charging applications.

For power and charging applications, a higher voltage power supply can be used. The higher voltage power supply can provide higher slew rates for the voltage pulses, thereby creating larger changes in the radial magnetic vector potential. Further, a duty cycle of the voltage pulses can be used to control the amount of time that electric field 1260 is generated. A higher duty cycle can provide a stronger electric field 1260. Further aspects of power systems are described below.

X. Communications

As discussed above, electric field 1260 can be generated to have a particular pattern. For example, the pattern (rate) of pulses can determine a time variance of the electric field. The pulses can be provided in a pattern, e.g., not always with uniform periodicity. For example, a series of pulses can be applied (e.g., over 10 microseconds), followed by 3 microseconds of no pulses. The pattern can be of any duration of pulses being applied and not being applied.

Pulse rates can change during a period of applying pulses, e.g., pulses could increase in frequency or decrease in frequency in a continuous fashion (e.g., each pulse occurring faster or slower than the last one). All of this variation can affect the overall time dependence of the electric field being generated. Thus, time dependence can be used to encode data, which can be decoded, e.g., via current in an output coil. As examples, the encoding can be based on amplitude modulation or frequency modulation. As another example, a series of pulses could be a binary 1, and a pause in pulses could be a binary 0. In various embodiments, the pulse rate can be equal to or greater than 1 kHz, 100 kHz, 500 kHz, 1 MHz, 1 GHz, or higher.

Applications for communications can use lower power than for charging applications. For example, communications can use input voltage pulses of 5 V to 50 V. For long distances, higher voltage can be used, as the resulting electric field would decay as $1/r^2$.

XI. System

A. Block Diagram

Figure 14:
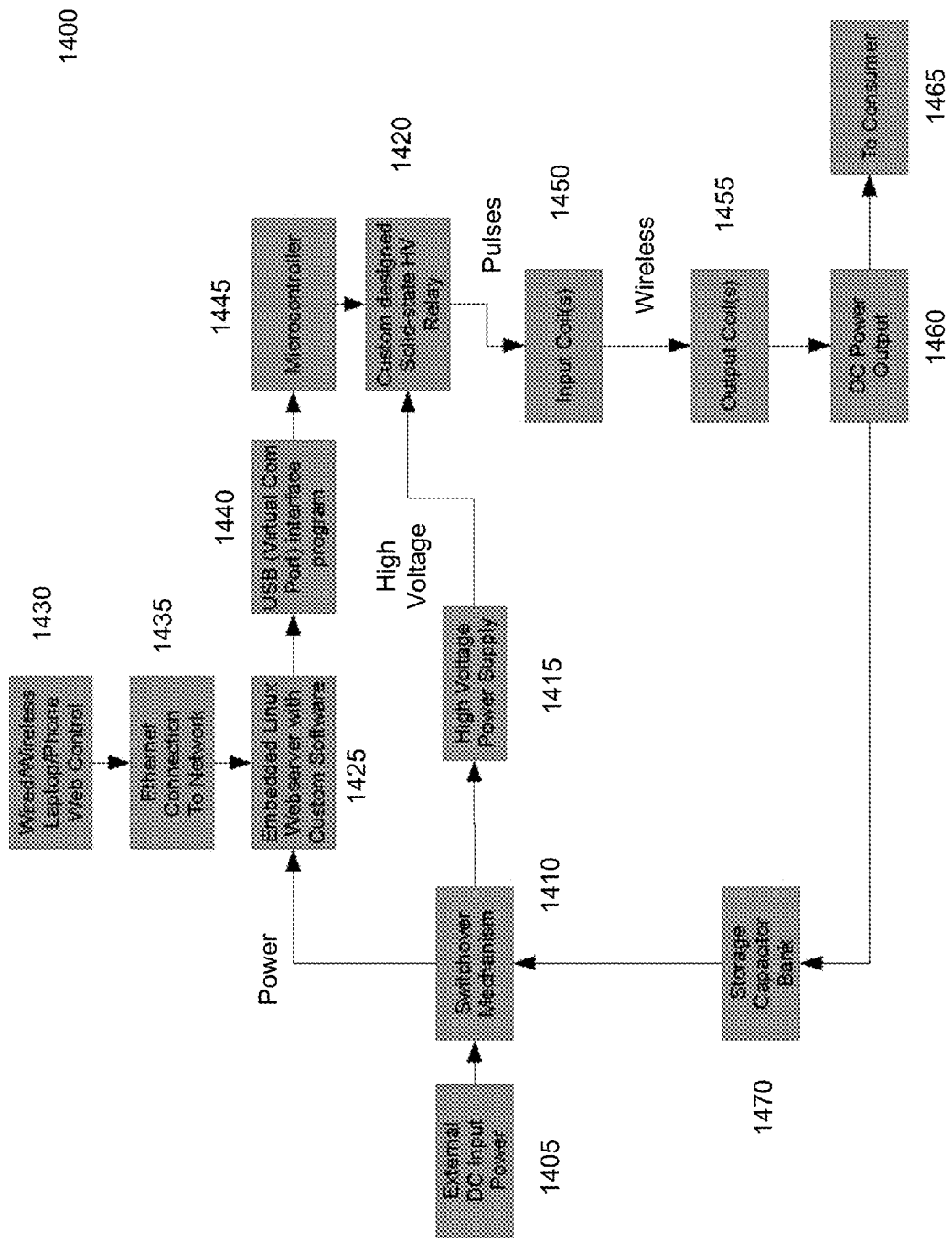
FIG. 14 is a block diagram of a system according to various embodiments of the present invention.

FIG. 14 is a block diagram of a system according to various embodiments of the present invention. DC input power 1405 (e.g., an external battery or DC converter connected to external AC power) can be used to provide a DC voltage to a high voltage power supply 1415. DC input power 1405 can act as an external power supply. A switchover mechanism 1410 can be placed between DC input power 1405 and HV power supply 1415, also called a power supply circuit. Switchover mechanism 1410 can also be connected to a storage capacitor bank 1470, and be used to determine whether power is sent to HV power supply 1415 from either DC input power 1405 or capacitor bank 1470. Various circuits, as shown, can be communicably coupled to each other.

The HV power supply 1415 (e.g., a step-up converter) can increase the DC voltage from DC input power 1405, and provide the high voltage to a relay (switching) mechanism 1420, labeled as solid-state HV relay. Switching mechanism 1420 can control when HV power supply 1415 is connected to input coil 1450. Thus, HV power supply 1415 is selectably connected to input coil 1450.

Switching mechanism 1420 can be controlled by a controller 1445, which in turn can be controlled by a Web server 1425 that connects to controller 1445 via USB interface 1440. Switching mechanism 1420 can be configured to connect and disconnect input coil 1450 to the power supply circuit. Controller 1445 can send signals to switching mechanism 1420 to control a connection state of switching mechanism 1420. The signals can be of any suitable form, e.g., periodic, non-periodic, etc. In one embodiment, a user's computer 1430 (e.g., a laptop or phone) can use our network connection 1435 to connect to Web server 1425 to provide instructions for configuring controller 1445, which can be set such that switching mechanism 1420 provides the desired voltage pulses.

Controller 1445 can be on a separate ground from the high voltage circuit (i.e., switching mechanism 1420 and inputs coil 1450). Controller 1445 can have an opto-electronic connection to switching mechanism 1420 so as to electrically isolate controller 1445 from the high voltage circuits of 1415 and 1420. Controller 1445 would normally operate on 5, 10, 12, or 15 volts, whereas the high voltage circuits of 1415 and 1420 can operate on 50 V, 100 V, or more (e.g., 4,000 V).

In one implementation, switchover mechanism 1410 can provide power to Web server 1425. Data can be transmitted between elements 1425-1445. Pulses are provided from switching mechanism 1420 to input conductor 1450 (e.g., an input coil). The pulses can create a divergent magnetic vector potential and a resulting electric field that induces a voltage and current in output conductor 1455 (e.g., an output coil). Thus, the connection between input coil 1450 and output coil 1455 is wireless. As input coil 1450 does not directly generate a significant magnetic field, additional power is not required to overcome any opposing induced current that would result from such a magnetic field. Input coil can be situated in another device or material so that an output coil can be placed in a manner to receive the electric field created by the time-varying magnetic vector potential.

DC power output 1460 can be obtained from the current in output coil 1455. DC power output 1460 can be provided to a consumer 1465, or more specifically to a consumer device to operate the consumer device. Any excess power can be saved in capacitor bank 1470, which can be used to replace or supplement DC input power 1405 for operating HV power supply 1415. Switchover mechanism 1410 can monitor (e.g., with a processor) the voltage from capacitor bank 1470, and switch the supply power from DC input power 1405 to capacitor bank 1470 when sufficient energy is stored in capacitor bank 1470. Other energy storage devices besides a capacitor bank can be used, as would be known to one skilled in the art.

B. Parameters

System 1400 can have various settings, e.g., as described herein. The settings can be designed to maximize the dI/dt for pulses to input coil 1450, minimize rise time for pulses to input coil 1450, and minimize the current I within input coil 1450. As for voltage, it is generally better to have higher voltage to increase dI/dt. In various embodiments, HV power supply 1415 can provide voltage pulses of at least 50 V (e.g., for communications) and at least 150 V (e.g., charging and higher). In one embodiment, HV power supply 1415 can produce at least 1 kV, where the wattage is less critical.

As for switching by relays 1420, the faster the rise time and fall time of the applied voltage to the wire the better as this allows the utilization of the generated dI/dt while minimizing I. In one implementation, a maximum pulse width is 1 μs (or other values mentioned herein) and the rise time is less than 30 ns.

The inductance of input conductor 1450 can depend on circuit elements (e.g., coil geometry and conductor material) and applied voltage pulse, as described above. A higher inductance can help to limit I, while a lower inductance can help to maximize dI/dt. A balance can be achieved to identify suitable inductance. A resistance of the wire similarly depends on circuit elements, where a higher resistance can help to limit I. Each of the elements described above can be optimized in order to make use of the divergent skin effect. In one aspect, no ferromagnetic materials are used in and about die coils.

C. Control Circuitry

Control circuitry (e.g., controller 1445 and other elements such as 1425 and 1430) can create the pulses with a specific frequency (pulse rate) and puke width (which may be independent per output). In devices consisting of more than one coil, the control circuitry can control the phase between pulses to the input coils, i.e., pulses coming out are at the same frequency but different phase with respect to pulses for a different input coil. For example, if three input coils are used, a phase can be set at 120 degrees, with all the coils operating at the same frequency. In one implementation, the pulse width can be independently changed per pulse.

D. Switching Circuitry

Switching mechanism 1420 can control the rise time and the fall time of the voltage pulse. The rise time can be faster when the switch can close faster. The exact form for the rising edge (e.g., slope, curvature, and exponential increase) can depend on the materials and configuration of the switching devices involved. The falling edge would have a certain decay shape. Once the switch is completely open (i.e., circuit is separated from the power supply), the voltage would be effectively zero in the circuit. Example switching circuitry can be found in concurrently filed U.S. Nonprovisional Application entitled "Using Skin Effect To Produce A Magnetic Vector Potential For Inducing A Voltage." Additional description of nanosecond pulse generators can be found in U.S. Pat. No. 8,120,207, which is incorporated by reference for all purposes.

E. Example Device

In one embodiment, a system comprises a 20 kV DC power supply, a polyethylene-based high power pulse capacitor bank rated at 0.119 uF @ 30 kV+, and an asymmetric switch. The system feeds a 28 AWG copper coil varying voltage levels up to 20 kV at varying pulse rates (cycles) per second. This enables the production of a radially produced electric field from the coil. To pulse the input coils with a fast 'slew rate' for the applied voltage or $\partial V/\partial t$ and to direct large quantities of switched pulses into varying numbers of input coils, a 6-channel, 1.5 kV solid state control system was designed. The coil can use varying gauges, e.g., down to 40 AWG.

In one implementation, the 0.119 uF capacitor bank includes pulsed power polyethylene capacitors with bleed-resistors. A switching mechanism can include a custom high slew-rate PCB switch, with a metal-oxide-semiconductor field-effect transistor (MOSFET) and/or IGBT.

XII. Example Results

A. Perpendicular Cylindrical Coils

Figure 15A:
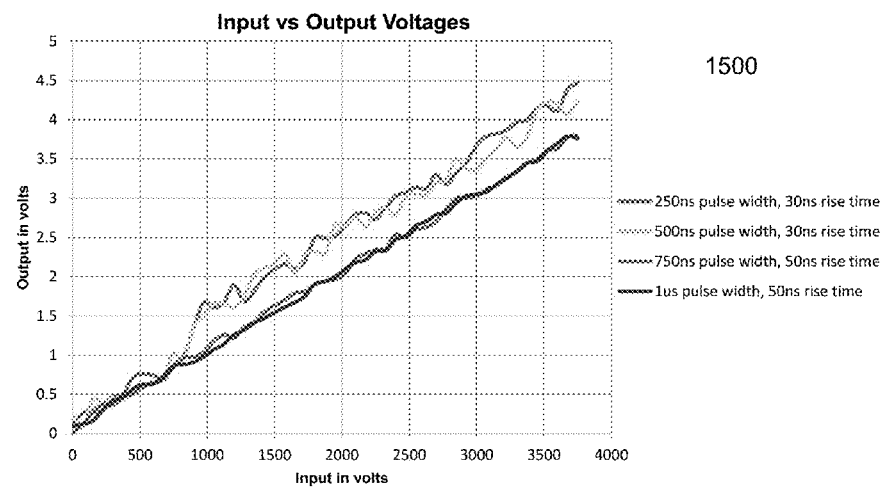
FIGS. 15A and 15B show plots of the amplitude of an input voltage pulse on an input conductor vs. the amplitude of an output voltage pulse induced in an output cylindrical coil perpendicular to an input cylindrical coil for various pulse widths and rise times according to embodiments of the present invention.
Figure 15B:
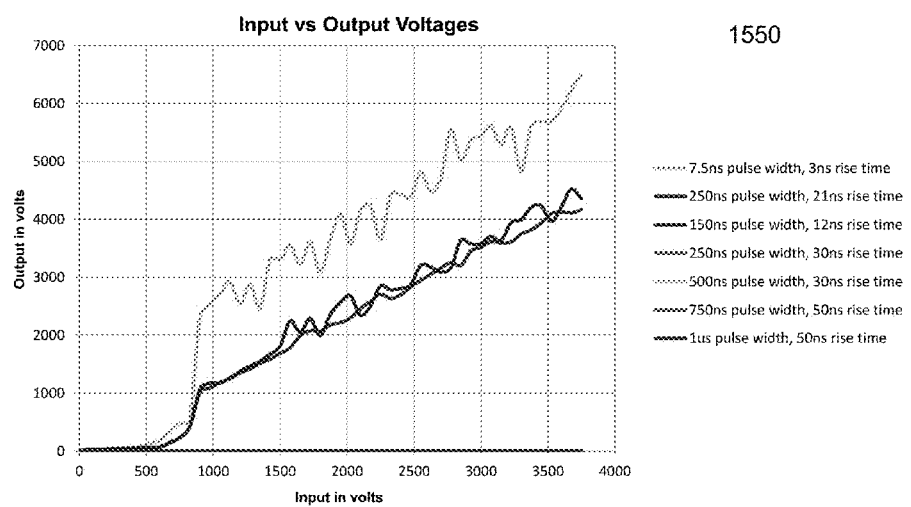

FIGS. 15A and 15B show plots of the amplitude of an input voltage pulse on an input conductor vs. the amplitude of an output voltage pulse induced in an output circuit for various pulse widths and rise times according to embodiments of the present invention. The voltages are the maximum voltage (amplitude) of the pulses. The input voltage pulses have widths that range from 1 μs to 7.5 ns, and the rise times range from 50 ns to 3 ns. FIGS. 15A and 15B show plots in different scales. A pulse rate of 1 kHz was used.

The plots are obtained for an input solenoid coil that has an axis that is perpendicular to an axis of an output solenoid coil (e.g., two cylindrical solenoids that are perpendicular to each other). Thus, for normal operation, a current in the input coil would not induce an appreciable current in the output coil since they are perpendicular to each other. In this geometrical configuration, there is no back coupling between the two coils that will oppose operation of a coil, thus no Lenz effect from one coil to another. Further, in terms of the self-induction (Lenz effect), the pulses are short enough that the amount of current along the input coil does not become large enough to have an appreciable Lenz effect.

FIG. 15A shows a plot 1500 of input vs. output voltages for rise times of 30 ns and 50 ns. As one can see, the output voltage is very small for these rise times. The input voltage is not inducing any voltage because of the geometry that the two coils are configured. There is some induction due to minor capacitive effects.

FIG. 15B shows a plot 1550 of input vs. output voltages for rise times from 50 ns to 3 ns. Only the output voltages for rise times of 21 ns, 12 ns, and 3 ns are visible since the output voltages for rise times 50 ns and 30 ns are so small. It is a surprising result that the output voltage becomes appreciable for less than 30 ns. Thus, when operating with pulses of less than 30 ns, one can induce an appreciable voltage that can be used for charging or communications in the output coil. And, due to the short pulses and coil geometry, the Lenz effect is reduced, while still allowing induction to occur. The jagged behavior in the curves is just due to noise, as the measurements can be sensitive to the environment.

FIG. 16 shows a table 1600 of the data points used to create plots 1500 and 1550 according to embodiments of the present invention. As one can see, the output voltage jumps from rise times of 30 ns to rise time of 21 ns, even when the pulse width stays the same (e.g., at 250 ns width). The jump in induced output voltage for rise times less than 30 ns occurs even with an input voltage of 1 V. There are also jumps when varying voltage for a given rise time, e.g., between 600 V and 675 V and between 825 V and 900 V.

The pulse width does not appreciably affect the induced voltage in the output circuit, at least not compared to the rise time. The pulse width can remain small so that power is not wasted by generating appreciable current in the input circuit, e.g., since that current is not being used to generate the output voltage due to the coil geometry. The output voltage is shown to increase for a smaller rise time. A smaller rise time creates a higher dI/dt as there is a higher dV/dt, which causes a higher $$\frac{\partial \vec{A}}{\partial t}.$$

Further, with smaller rise times and pulse widths, the lower the ultimate power used for the input voltages, because if the input pulse gets to the top quicker then the pulses can be dropped sooner.

As an appreciable output voltage is seen, the effects can be attributed to the longitudinal magnetic vector potential A, since induction would not normally happen, given the coil geometries. It appears that if the rise in voltage lasts for too long (e.g., 30 ns or more), then the induced voltage is low. The cause may be that current begins to flow and self-induction effects negate the MVPA effects.

As to inducing output pulses in the output circuit with such short input pulses, the pulse rate can increase depending on the charging and power needs, e.g., depending on rise times and induced output voltages. For communications, the faster rise times can provide for communications at longer distances due to the higher electric field.

B. Toroidal and Pancake Coils

Figure 17A:
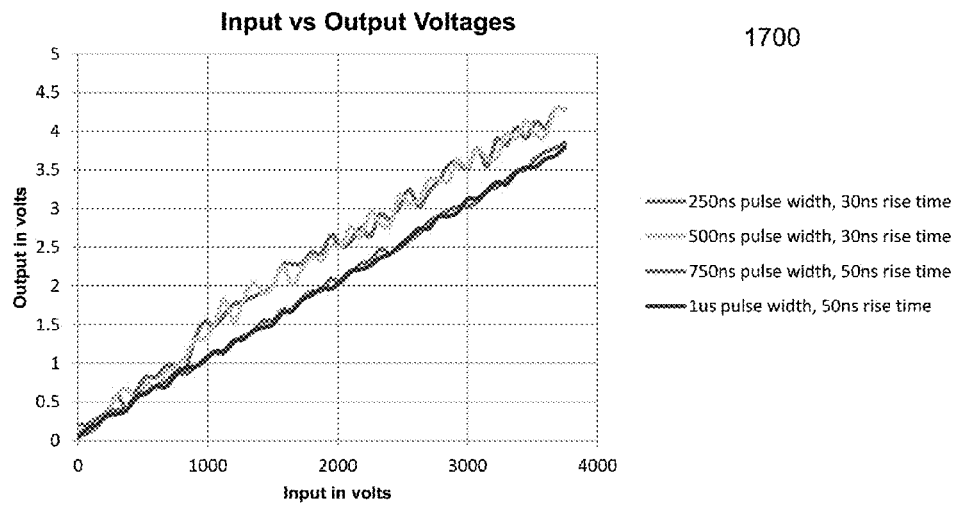
FIGS. 17A and 17B show plots of the amplitude of an input voltage pulse on an input conductor vs. the amplitude of an output voltage pulse induced in an output pancake coil for various pulse widths and rise times according to embodiments of the present invention.
Figure 17B:
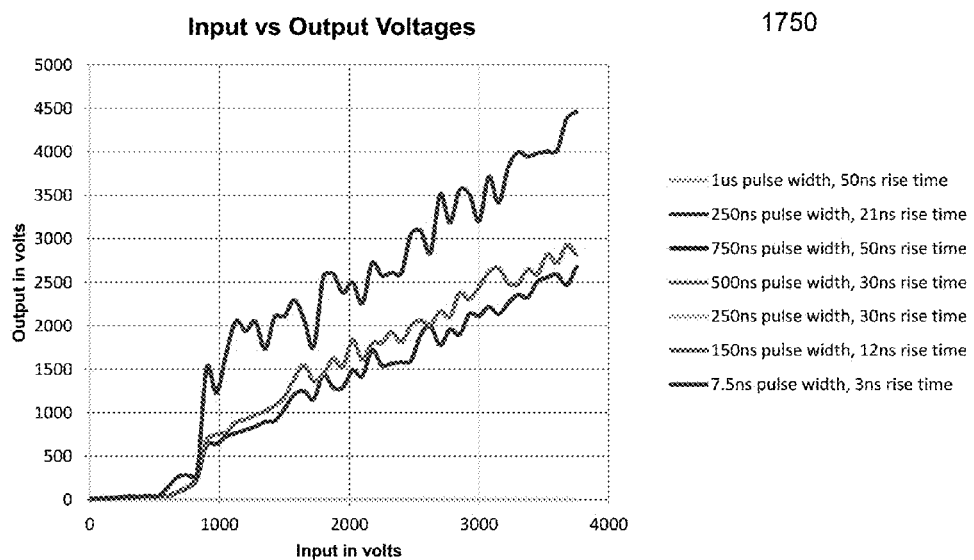

FIGS. 17A and 17B show plots of the amplitude of an input voltage pulse on an input conductor vs. the amplitude of an output voltage pulse induced in an output pancake coil for various pulse widths and rise times according to embodiments of the present invention. The voltages are the maximum voltage (amplitude) of the pulses. The input voltage pulses have widths that range from 1 μs to 7.5 ns, and the rise times range from 50 ns to 3 ns. FIGS. 17A and 17B show plots in different scales. A pulse rate of 1 kHz was used.

The plots are obtained for a coil geometry as depicted in FIGS. 13 and 13B. An input toroidal coil is within a pancake coil. Thus, for normal operation, a current in the input coil would not induce an appreciable current in the output coil since the pancake coil is outside of the toroid. In this geometrical configuration, there is no back coupling between the two coils that will oppose operation of a coil, thus no Lenz effect from one coil to another. Further, in terms of the self-induction (Lenz effect), the pulses are short enough that the amount of current along the input coil does not become large enough to have an appreciable Lenz effect.

FIG. 17A shows a plot 1700 of input vs. output voltages for rise times of 30 ns and 50 ns. As one can see, the output voltage is very small for these rise times. The input voltage is not inducing any voltage because of the geometry that the two coils are configured. There is some induction due to minor capacitive effects.

FIG. 17B shows a plot 1750 of input vs. output voltages for rise times from 50 ns to 3 ns. Only the output voltages for rise times of 21 ns, 12 ns, and 3 ns are visible since the output voltages for rise times 50 ns and 30 ns are so small. It is a surprising result that the output voltage becomes appreciable for less than 30 ns. Thus, when operating with pulses of less than 30 ns, one can induce an appreciable voltage that can be used for charging or communications in the output coil. And, due to the short pulses and coil geometry, the Lenz effect is reduced, while still allowing induction to occur. The jagged behavior in the curves is just due to noise, as the measurements can be sensitive to the environment.

FIG. 18 shows a table 1800 of the data points used to create plots 1700 and 1750 according to embodiments of the present invention. As one can see, the output voltage jumps from rise times of 30 ns to rise time of 21 ns, even when the pulse width stays the same (e.g., at 250 ns width). The jump in induced output voltage for rise times less than 30 ns occurs even with an input voltage of 1 V. There are also jumps when varying voltage for a given rise time, e.g., between 525 V and 600 V for the 3 ns rise time, and between 825 V and 900 V for rise times of 21 ns, 12 ns, and 3 ns.

The pulse width does not appreciably affect the induced voltage in the output circuit, at least not compared to the rise time. The pulse width can remain small so that power is not wasted by generating appreciable current in the input circuit, e.g., since that current is not being used to generate the output voltage due to the coil geometry. The output voltage is shown to increase for a smaller rise time. A smaller rise time creates a higher dI/dt as there is a higher dV/dt, which causes a higher $$\frac{\partial \vec{A}}{\partial t}.$$

Further, with smaller rise times and pulse widths, the lower the ultimate power used for the input voltages, because if the input pulse gets to the top quicker then the pulses can be dropped sooner.

As an appreciable output voltage is seen, the effects can be attributed to the longitudinal magnetic vector potential A, since induction would not normally happen, given the coil geometries. It appears that if the rise in voltage lasts for too long (e.g., 30 ns or more), then the induced voltage is low. The cause may be that current begins to flow and self-induction effects negate the MVPA effects.

As to inducing output pulses in the output circuit with such short input pulses, the pulse rate can increase depending on the charging and power needs, e.g., depending on rise times and induced output voltages. For communications, the faster rise times can provide for communications at longer distances due to the higher electric field.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An apparatus comprising:
    a power supply circuit for providing a DC voltage;
    an input conductor selectably connected to the power supply circuit, the input conductor extending along a plane;
    a switching mechanism coupled between the power supply circuit and the input conductor and configured to connect and disconnect the input conductor to the power supply circuit;
    a controller communicably coupled with the switching mechanism for controlling a connection state of the switching mechanism, wherein the controller is configured to control the switching mechanism, such that the power supply circuit provides a series of input voltage pulses to the input conductor, thereby creating a radial electric field extending from the input conductor; and
    an output circuit that at least partially resides in the plane and that extends away from the input conductor in the plane, the output circuit not being electrically connected to the input conductor, wherein the output circuit is configured to receive the radial electric field such that output voltage pules are induced in the output circuit.

2. The apparatus of claim 1, further comprising:
    an energy storage device that is electrically coupled with the output circuit and that is configured to store electrical energy created by the radial electric field interacting with the output circuit; and
    a switchover mechanism configured to receive power from the energy storage device and to provide power to the power supply circuit, the switchover mechanism further configured:
        to receive power from an external power supply, and
        to determine whether to supply the power from the external power supply or the energy storage device to the power supply circuit.

3. The apparatus of claim 1, wherein the input conductor includes a wire lying in the plane, and wherein the output circuit includes a wire that extends from the input conductor along the plane.

4. The apparatus of claim 1, wherein the input conductor includes an input coil.

5. The apparatus of claim 4, wherein the input coil includes a solenoid comprising a plurality of input windings of a conducting material.

6. The apparatus of claim 5, wherein the plane bisects the plurality of input windings.

7. The apparatus of claim 5, wherein the solenoid is a toroidal solenoid, wherein the output circuit includes an output coil in the plane, and wherein output windings of the output coil are circular in the plane with successive windings extending father away from the toroidal solenoid.

8. The apparatus of claim 5, wherein the solenoid is a cylindrical solenoid, wherein the output circuit includes a first output coil in the plane, the first output coil including first windings lying in the plane on a first side of the cylindrical solenoid such that a first axis of the first output coil extends away from the cylindrical solenoid.

9. The apparatus of claim 8, further comprising:
a second output coil including second windings lying in the plane on a second side of the cylindrical solenoid such that a second axis of the second output coil extends away from the cylindrical solenoid.

10. The apparatus of claim 1, wherein each input voltage pulse has a rise time of less than 30 nanoseconds and has an amplitude of at least 1 volt.

11. The apparatus of claim 10, wherein each input voltage pulse has an amplitude of at least 900 volts.

12. The apparatus of claim 10, wherein the series of input voltage pulses creates a time-varying magnetic vector potential that generates the radial electric field, and wherein the time-varying magnetic vector potential forms a longitudinal wave.

13. The apparatus of claim 1, wherein each input voltage pulse has a slew rate of more than 10 V volts per nanosecond.

14. The apparatus of claim 1, wherein each input voltage pulse has a pulse width of 100 microseconds or less.

15. The apparatus of claim 14, wherein each input voltage pulse has a pulse width of 1 microsecond or less.

16. The apparatus of claim 1, wherein the controller is configured to provide signals to the switching mechanism to control the connection state of the switching mechanism, and wherein the signals are not periodic.

17. A method of providing wireless communication, the method comprising:
receiving, at an output circuit, a time-varying magnetic vector potential, the time-varying magnetic vector potential being curl-free and varying in a direction of propagation of the magnetic vector potential; and
inducing a current in the output circuit in response to the time-varying magnetic vector potential, wherein the output circuit includes a conductor connected to a load, wherein the current is induced in the conductor, wherein the time-varying magnetic vector potential creates an electric field that induces the current, wherein the conductor has a first lead that is at a higher voltage than a second lead.

18. The method of claim 17, wherein the output circuit includes a pancake coil that resides in a plane, and wherein the time-varying magnetic vector potential propagates radially from an inner coil having the first lead to an outer coil having the second lead.

19. The method of claim 17, wherein the output circuit includes a wire that resides in a plane, and wherein the time-varying magnetic vector potential propagates in a direction having a component that is parallel to the wire.

20. The method of claim 17, wherein the output circuit includes a cylindrical coil of circular windings having an axis through the circular windings, and wherein the time-varying magnetic vector potential propagates in a direction having a component that is parallel to the axis.

21. An apparatus comprising:
an output circuit configured to receive a time-varying magnetic vector potential such that the time-varying magnetic vector potential induces a current in the output circuit, the time-varying magnetic vector potential being curl-free and forming a longitudinal wave, wherein the output circuit includes a wire, and wherein the wire forms a coil, and
wherein the coil is a pancake coil having a plurality of rings, the pancake coil forming a plane, wherein an inner ring of the pancake coil is a first ring that receives the time-varying magnetic vector potential, wherein the time-varying magnetic vector potential radiates outwardly in the plane toward the inner ring.

22. The apparatus of claim 21, further comprising:
an input circuit that comprises an input coil that lies in the plane.

23. The apparatus of claim 21, further comprising:
an input circuit that comprises a toroidal solenoid that lies in the plane.

24. The apparatus of claim 23, wherein the plane resides in a center of coils of the toroidal solenoid.

25. An apparatus comprising:
an output circuit configured to receive a time-varying magnetic vector potential such that the time-varying magnetic vector potential induces a current in the output circuit, the time-varying magnetic vector potential being curl-free and forming a longitudinal wave, wherein the output circuit includes a wire, and wherein the wire forms a coil, and
wherein the coil is a first cylindrical solenoid having a plurality of rings, a first axis of the first cylindrical solenoid being through a center of the plurality of rings, and wherein the time-varying magnetic vector potential propagates in a direction having a component that is parallel to the first axis.

26. The apparatus of claim 25, further comprising:
an input circuit that comprises a second cylindrical solenoid having a second axis that that lies in a same plane as the first axis and that is perpendicular to the second axis.

* * * * *